(12) United States Patent
Baker

(10) Patent No.: US 8,033,744 B2
(45) Date of Patent: Oct. 11, 2011

(54) KEYBOARD FOR A HANDHELD COMPUTER DEVICE

(76) Inventor: Paul Lloyd Baker, Glen Waverley (AU)

( * ) Notice: Subject to any disclaimer, the term of this patent is extended or adjusted under 35 U.S.C. 154(b) by 719 days.

(21) Appl. No.: 11/658,609

(22) PCT Filed: Jul. 29, 2005

(86) PCT No.: PCT/AU2005/001128
§ 371 (c)(1),
(2), (4) Date: Jan. 25, 2007

(87) PCT Pub. No.: WO2006/010225
PCT Pub. Date: Feb. 2, 2006

(65) Prior Publication Data
US 2008/0304892 A1  Dec. 11, 2008

(30) Foreign Application Priority Data

Jul. 29, 2004  (AU) .................. 2004904255

(51) Int. Cl.
*G06F 3/023* (2006.01)
(52) U.S. Cl. ..................... 400/486; 400/489
(58) Field of Classification Search ............ 400/486, 400/489; D14/247, 455, 391, 399
See application file for complete search history.

(56) References Cited

U.S. PATENT DOCUMENTS

| | | | |
|---|---|---|---|
| 2,040,248 A | 5/1932 | Dvorak et al. | |
| 3,698,533 A * | 10/1972 | Illig et al. | 400/486 |
| 3,847,263 A | 11/1974 | X | |
| 3,945,482 A | 3/1976 | Einbinder | |
| 3,970,185 A | 7/1976 | Shelton | |
| 4,180,337 A | 12/1979 | Otey, III et al. | |
| 4,804,279 A | 2/1989 | Berkelmans et al. | |
| 4,927,279 A | 5/1990 | Morgan | |
| 5,006,001 A | 4/1991 | Vulcano | |
| 5,059,048 A | 10/1991 | Sirkin | |
| 5,067,834 A | 11/1991 | Szmanda | |
| 5,170,348 A | 12/1992 | Hirose | |
| 5,288,158 A | 2/1994 | Matias | |
| 5,336,002 A | 8/1994 | Russo | |

(Continued)

FOREIGN PATENT DOCUMENTS

AU  200035322 A1  11/2001

(Continued)

OTHER PUBLICATIONS

Mackenzie et al., "Text Entry for Mobile Computing: Models and Methods, Theory and Practice", Human-Computer Interaction, vol. 17, pp. 147-198, 2002.

(Continued)

*Primary Examiner* — Daniel J Colilla
(74) *Attorney, Agent, or Firm* — Knobbe Martens Olson & Bear LLP

(57) ABSTRACT

A keyboard for a hand held computer device including an array of keys representing characters of an alphabet of a language, wherein the array includes: (a) keys representing frequently used vowel characters of said alphabet arranged together in series; (b) keys representing frequently used consonant characters of said alphabet arranged adjacent to said keys representing vowel characters; and (c) keys representing infrequently used consonant characters of said alphabet arranged in positions remote from said keys representing vowel characters, wherein the keys representing frequently used consonant characters are arranged in alphabetical order around the keys representing the vowel characters.

11 Claims, 19 Drawing Sheets

U.S. PATENT DOCUMENTS

| | | | |
|---|---|---|---|
| 5,352,050 | A | 10/1994 | Choate |
| 5,410,333 | A | 4/1995 | Conway |
| 5,487,616 | A | 1/1996 | Ichbiah |
| 5,497,151 | A | 3/1996 | Dombroski |
| 5,500,643 | A | 3/1996 | Grant |
| 5,626,428 | A | 5/1997 | Miwa |
| 5,847,697 | A | 12/1998 | Sugimoto |
| 5,879,089 | A | 3/1999 | Armel |
| 6,098,086 | A | 8/2000 | Krueger et al. |
| 6,102,594 | A | 8/2000 | Storm |
| 6,142,687 | A | 11/2000 | Lisak |
| 6,297,752 | B1 | 10/2001 | Ni |
| 6,348,878 | B1 | 2/2002 | Tsubai |
| D524,820 | S * | 7/2006 | Baker .................. D14/486 |
| 7,439,959 | B2 * | 10/2008 | Griffin et al. ............ 345/169 |
| 2001/0048428 | A1 | 12/2001 | Ukita |
| 2003/0020692 | A1 | 1/2003 | Griffin et al. |
| 2003/0095105 | A1 | 5/2003 | Vaeaenaenen |
| 2003/0103041 | A1 * | 6/2003 | Nguyen et al. ............ 345/168 |
| 2006/0228149 | A1 * | 10/2006 | Harley ..................... 400/486 |

FOREIGN PATENT DOCUMENTS

| | | |
|---|---|---|
| DE | 972 465 | 10/1959 |
| EP | 0 066 991 A2 | 12/1982 |
| EP | 0297 663 B1 | 1/1989 |
| GB | 315053 | 7/1929 |
| GB | 2 362 133 A | 11/2001 |
| JP | 63282515 A * | 11/1988 |
| JP | 07-160387 | 6/1995 |
| JP | 11-053085 | 2/1999 |
| JP | 2000339091 A * | 12/2000 |
| JP | 2001-075707 | 3/2001 |
| WO | WO 81/03641 | 12/1981 |
| WO | WO 99/06216 | 2/1999 |
| WO | WO 01/96997 A1 | 12/2001 |

OTHER PUBLICATIONS

Hunter et al., "Physics-based Graphical Keyboard Design," Short paper. Proceedings of CHI 2000, 2000.

Norman et al., "Why alphabetic keyboards are not easy to use: Keyboard Layout Doesn't Much Matter," Human Factors, 1982 vol. 24 No. 5, pp. 509-519.

Sears et al., "The role of visual search in the design of effective soft keyboards," Behavior & Information Technology, 2001, vol. 20 No. 3, pp. 159-166.

Zhai et al., "The Metropolis Keyboard: an exploration of quantitative techniques for virtual keyboard design," Proceedings of ACM Symposium on User Interface Software and Technology (UIST 2000), pp. 119-128, Nov. 2000.

The World of Stuff The Dvorak Keyboard and You' (online), Retrieved from the Internet <URL:http://web.archive.org/web/20040301230818/www.theworldofstuff.com/dvorak/>.

International Search Report for International Application No. PCT/AU2005/001128 dated Aug. 31, 2005 by Australian Patent Office.

* cited by examiner

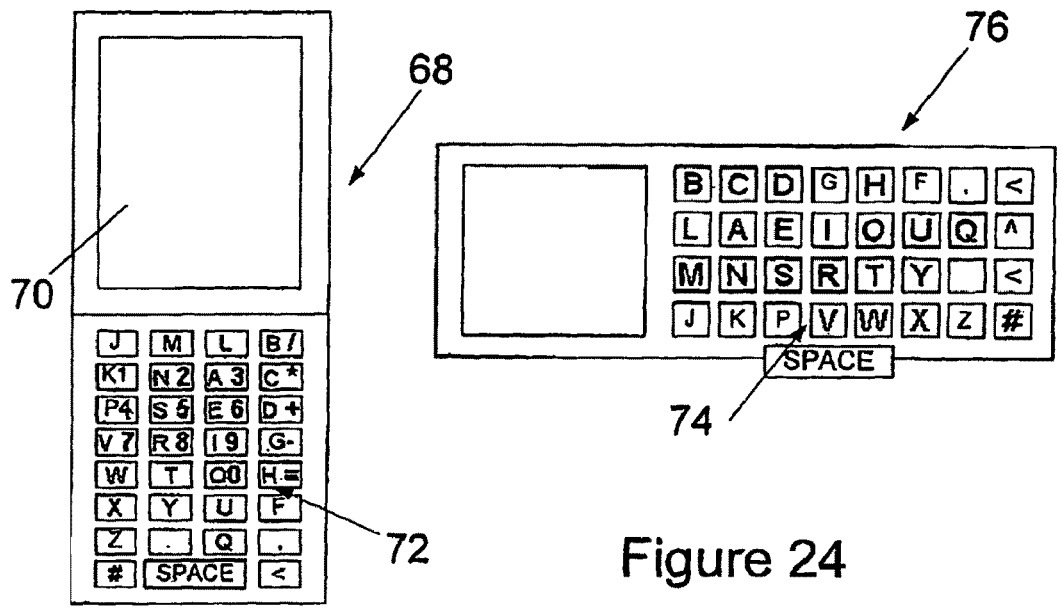
Figure 23
Figure 24
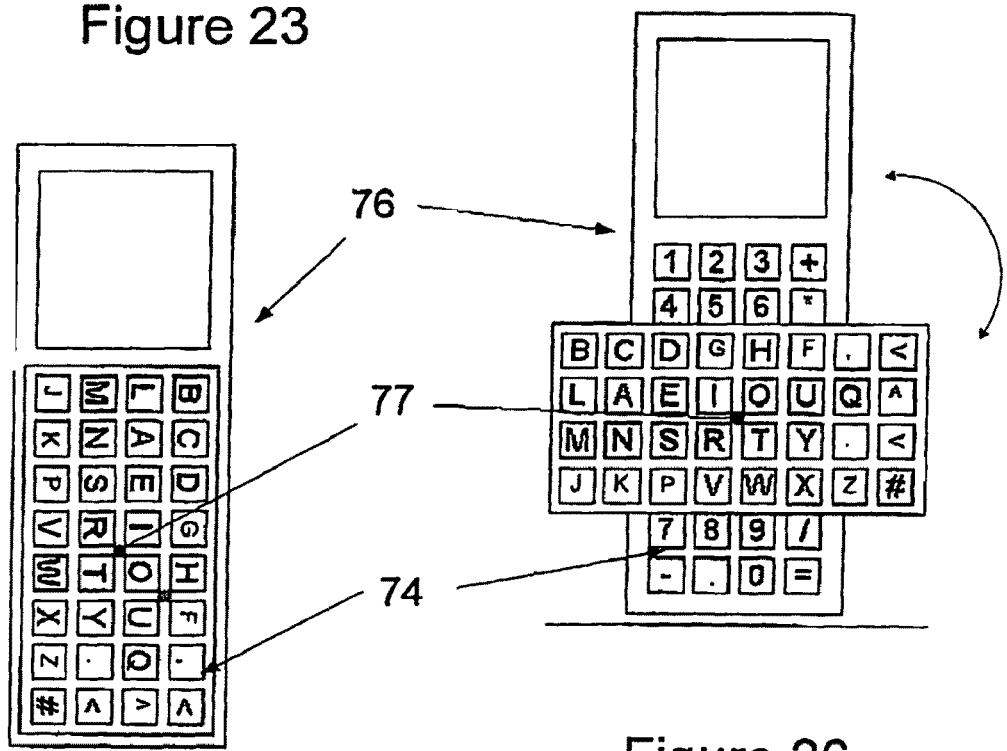
Figure 25
Figure 26

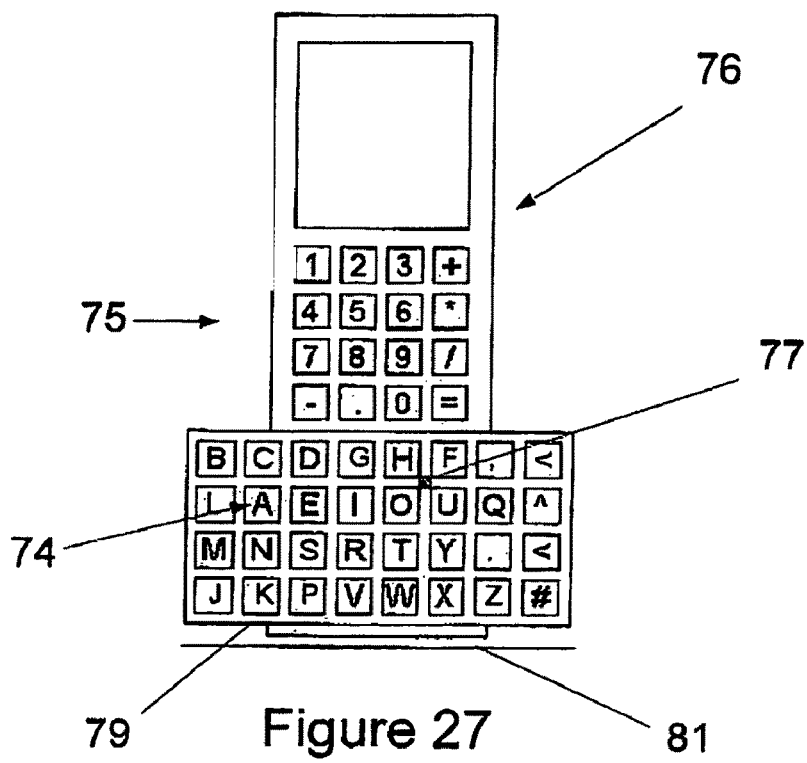
Figure 27
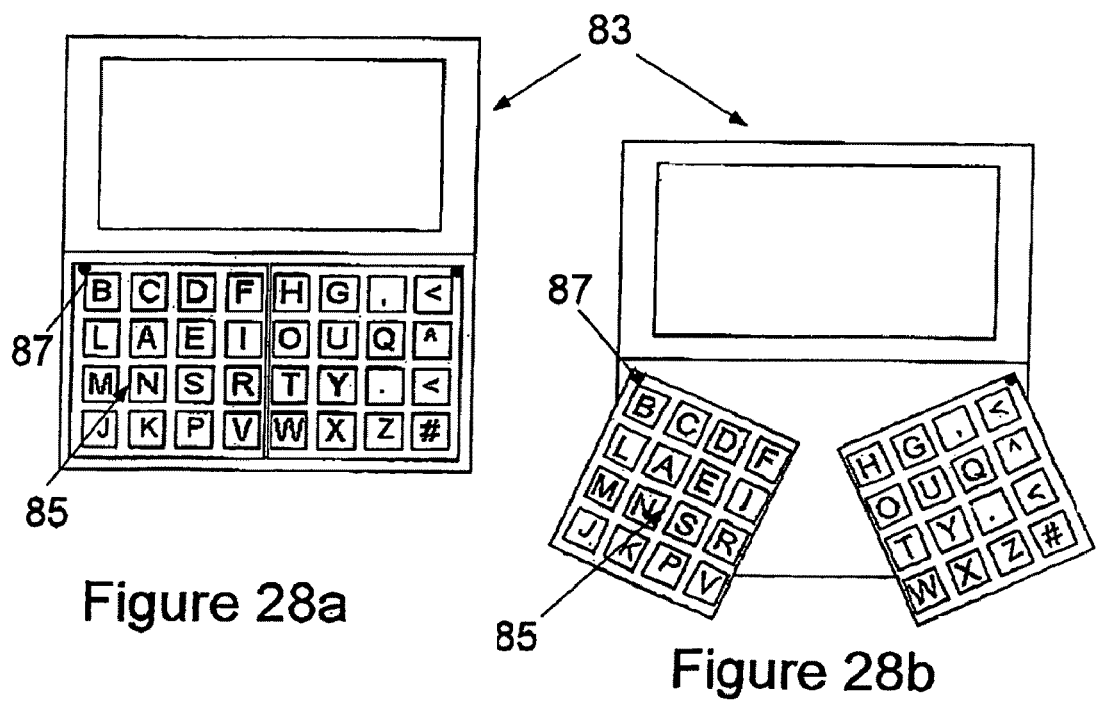
Figure 28a
Figure 28b

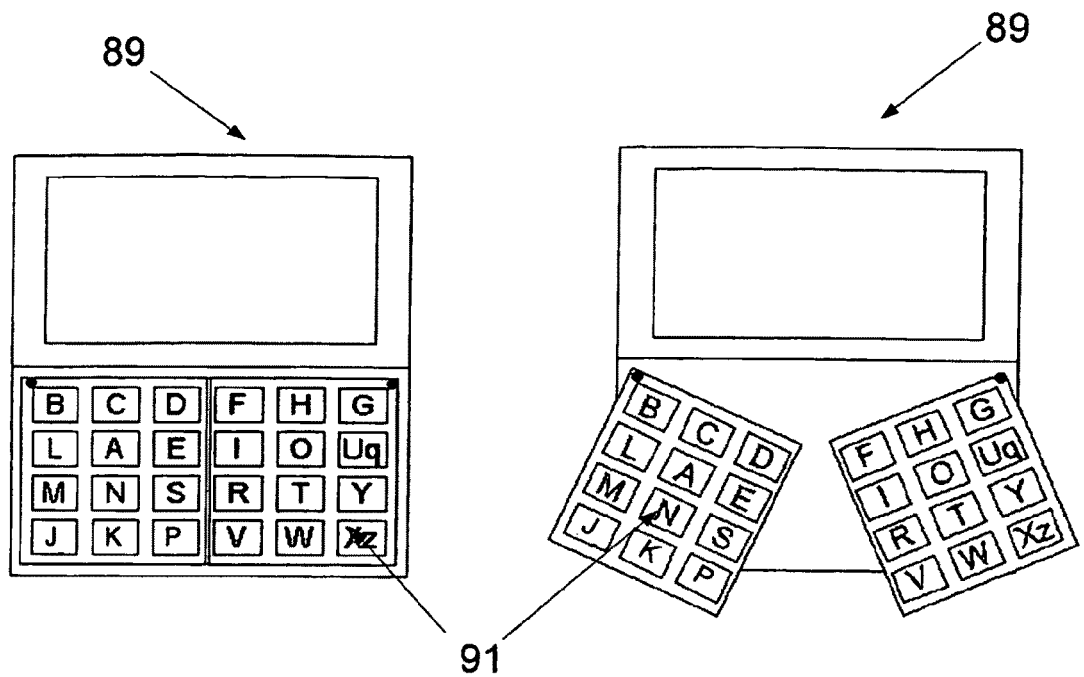
Figure 28c
Figure 28d
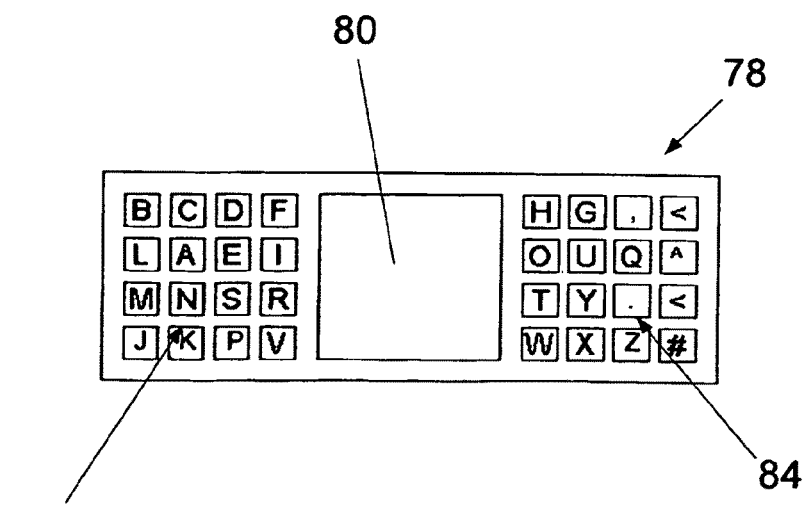
Figure 29

KEYBOARD FOR A HANDHELD COMPUTER DEVICE

FIELD OF THE INVENTION

The present invention relates to a keyboard for a handheld computer device.

BACKGROUND OF THE INVENTION

Keyboards of various permutations and configurations have been proposed over the years to try and provide for the efficient entry of alphanumeric characters to computer devices and systems. The English QWERTY keyboard that is currently used on a number of devices evolved from the keyboard that is used for typewriters. The QWERTY layout of keys for typewriters was required to prevent the mechanical mechanism associated with the keyboard from jamming. This, of course, is no longer a problem that besets today's electronic keyboards, but the QWERTY layout is still favoured by experienced touch typists. The QWERTY layout, however, continues to pose difficulties for anyone who is not an experienced touch typist. In particular, the QWERTY layout also imposes significant difficulties for users of small computer devices.

Typing textual information quickly, easily and without error into small computer devices such as mobile telephones, personal digital assistants (PDAs), and the like, is a challenge that limits the potential use of such devices. Mobile telephones include, for example, a 10 or 12 button numeric key pad, where text entry is effected by way of multi-tapping keys or by way of Tegic T9 word disambiguation software. Text entry into such devices is generally limited to SMS messages of less than 160 characters. PDAs are typically better adapted for use in entry of longer passages of text but key layouts still pose difficulties. "Smartphones" that combine the functionality of mobile telephones and PDAs are becoming increasingly more popular, but these devices suffer the same difficulties. It is possible to connect a Smartphone or a PDA with a QWERTY keyboard, however, the addition of such a device somewhat defeats the original aim of having a small portable device.

The full QWERTY keyboard has also been miniaturised to fit small handheld computer devices with either hardware buttons and thumb-boards on recent mobile messaging devices, or as a virtual software input panel. However squeezing a 10 column QWERTY keyboard across the width of a device that can comfortably sit in the hand results in a very small key board with tiny buttons that are hard to use. Further the indicia of such keyboards are typically difficult to read and use without error. These difficulties especially impact those with poor eyesight and/or large hands.

The QWERTY keyboard is designed for two-handed use where frequent two-pair letter combinations are hit by alternate hands and different fingers. As such, if one finger, or stylus, is being used to tap the keys on a QWERTY keyboard, then considerable time is spent unproductively moving the stylus from one side of the keyboard to the other. Besides slowing down text entry, this continual hand movement can be very fatiguing after typing even short passages of text.

Text entry through handwriting recognition systems is typically slower than text entry by way of a QWERTY keyboard, for example. This is largely due to the time involved in writing and recognising a full character or word being more than the time involved in simply tapping a key.

Speech recognition systems have also been used but generally require low background noise and powerful software and hardware. Moreover, it may not always be appropriate to enter text via dictation when in the company of others. Sophisticated chording and gesture driven techniques based on shorthand techniques can typically only be applied with special interfaces and software. Furthermore, such systems generally require users to practice for a long time to acquire proficiency and acceptable productivity.

With just a single stroke or tap per character, keyboard based techniques still have potential for rapid text input. One such method involves analysis of all the letter pair frequencies in a corpus of text and use of an algorithm to create and test layouts that minimise the "travel distance" between the keys or the "travel time". This distance-based approach has resulted in circular or square arrangements of keys of dimensions 6×5 rows with the Space keys located near the centre of the keyboard, high frequency keys closer to the centre and the lowest frequency at the far corners of the keyboard. On first appearance, these keyboards almost appear to have random, illogical letter placement. Consequently, these keyboards have proven to be difficult to learn and require a lot of practice to achieve the same level of productivity as is achievable with a QWERTY keyboard, for example.

Accordingly, it is desired to address the above, or at least provide a useful alternative.

SUMMARY OF CERTAIN INVENTIVE ASPECTS

In accordance with one aspect of the present invention there is provided a keyboard for a hand held computer device including an array of keys representing characters of an alphabet of a language, wherein the array includes:
(a) keys representing frequently used vowel characters of said alphabet arranged together in series;
(b) keys representing frequently used consonant characters of said alphabet arranged adjacent to said keys representing vowel characters; and
(c) keys representing infrequently used consonant characters of said alphabet arranged in positions remote from said keys representing vowel characters,
wherein the keys representing frequently used consonant characters are arranged in alphabetical order around the keys representing the vowel characters.

Preferably, said one or more keys representing frequently used consonant characters are arranged adjacent keys representing vowel characters that they are frequently paired together with in words of said language.

Preferably, said one or more keys representing frequently used consonant characters are arranged adjacent keys representing vowel characters that they are frequently paired together with in the former parts of words of said language.

In accordance with another aspect of the present invention there is provided a process for determining a layout of keys of a keyboard of a hand held computer device, said keys representing characters of an alphabet of a language, including the steps of:
(a) determining frequency of use of characters said alphabet;
(b) arranging keys representing frequently used vowels characters of said alphabet in series on said keyboard;
(c) arranging keys representing frequently used consonant characters of the alphabet adjacent first and second sides of the vowel keys; and
(d) arranging keys representing less frequently used consonant characters of said alphabet in positions on the keyboard remote from the keys representing the vowel characters, wherein said keys representing frequently used consonant keys being arranged in alphabetical order around said keys representing vowel characters.

Preferably, said one or more keys representing frequently used consonant characters are arranged adjacent keys representing vowel characters that they are frequently paired together with in words of said language.

Preferably, said one or more keys representing frequently used consonant characters are arranged adjacent keys representing vowel characters that they are frequently paired together with in the former parts of words of said language.

In accordance with another aspect of the present invention there is provided a keyboard having a layout of keys determined by the above described.

In accordance with another aspect of the present invention there is provided a keyboard for a hand held computer device including the above described keyboard.

In accordance with one aspect of the present invention there is provided a keyboard for a computer device, including:
(a) vowel keys for commonly used vowel characters of a language arranged in series;
(b) common consonant keys for the most commonly used consonant characters in words of said language adjacent said vowel keys; and
(c) remaining consonant keys for the remaining consonant characters of said language arranged remote to said vowel keys.

Preferably, said vowel keys are in a central location of said keyboard.

In accordance with one aspect of the present invention there is provided a keyboard for a mobile computer device including the above described keyboard.

BRIEF DESCRIPTION OF THE DRAWINGS

Preferred embodiments of the present invention are hereinafter described, by way of non-limiting example only, with reference to the accompanying drawings in which:

FIGS. 20 to 29 are plan views of messaging devices, such as mobile phones, having alternative preferred keyboards according to the present invention;

DETAILED DESCRIPTION OF CERTAIN INVENTIVE EMBODIMENTS

Figure 1:
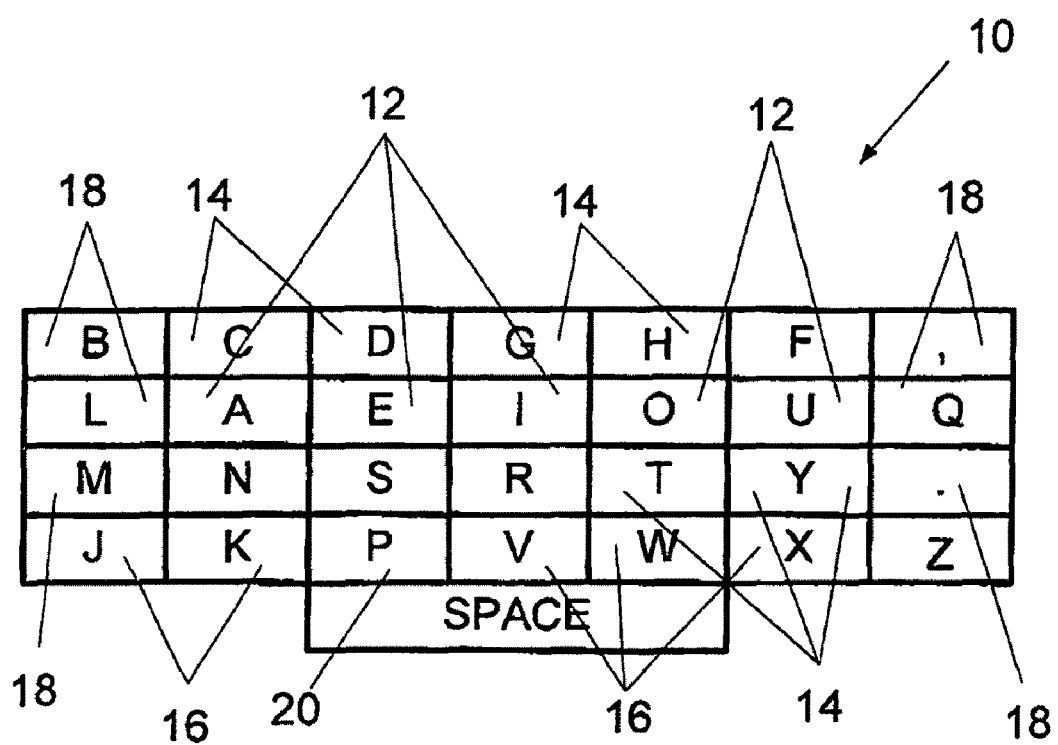
FIG. 1 is a schematic diagram of a key layout of a preferred embodiment of a keyboard.

The array of character keys 10 shown in FIG. 1 represent a set of input keys of a keyboard of a handheld computer device (not shown). The array of character keys 10 includes vowel keys 12 for the vowel characters of the English language arranged side by side, in alphabetical order, across a generally central row of the array of character keys 10. The array of character keys 10 also includes commonly used consonant keys 14 (also referred to as most frequent consonant keys). The commonly used consonant keys 14 are arranged adjacent the vowel keys 12. Less commonly used consonant keys 16 (also referred to as less frequent consonant keys) are arranged adjacent the common consonant keys 14. The position of the less commonly used consonant keys 16 reduces interference with the more frequently used consonant-vowel character combinations.

The handheld computer device may be any device having data processing capabilities and which allows the input of language characters or alphanumeric characters. For example, the device may be a standard personal computer as produced by the IBM Corporation, a mobile telephone, such as produced by Nokia Corporation or a Personal Digital Assistant (PDA), such as the iPaq produced by Hewlett-Packard or PalmOS devices produced by PalmOne, Inc. or a combination smartphone device such as the P900 produced by Sony-Ericsson.

The layout of the keys 10 of the keyboard has been determined using a layout process described below for English as a target language. The process, as will be appreciated from the description of the additional embodiments, can be readily adapted for other target languages.

The process begins with a horizontal keyboard which can then be re-oriented in final steps of the process.

(i) Firstly data is obtained on letter use frequencies and commonly used letter pair sequences for the target language. Ideally the data is first corrected for Zipf's Law effects. Zipf's power law describes the phenomenon that just a few words are very common, while many words are very uncommon. If also available, data on the frequency of use of the first three letters of words is obtained and is used to optimise the layout for use with data input rate enhancement methods.

(ii) Determine shape of the handheld computer device to which the keyboard is coupled; the space available on the handheld computer device for the keyboard; the intended use of the handheld computer device; and the number of vowels and consonants in the target language. Visual processing research has shown that humans can simultaneously "parallel" process about 3 short rows of text imaged onto the eye to quickly identify and recognise about 20 characters. The implication is that a horizontal keyboard should preferably be as compact as possible with a target of 3 rows of common characters and as few text-free areas as possible. For example, a one-handed keyboard with 4 rows by 7 columns for the 26 letters in the English Language fits this criteria. This compact form factor also has the advantage of allowing larger buttons to be used which also increases usability. Such a layout allows the 5 vowels to be centred in the second row from the top.

Figure 2:
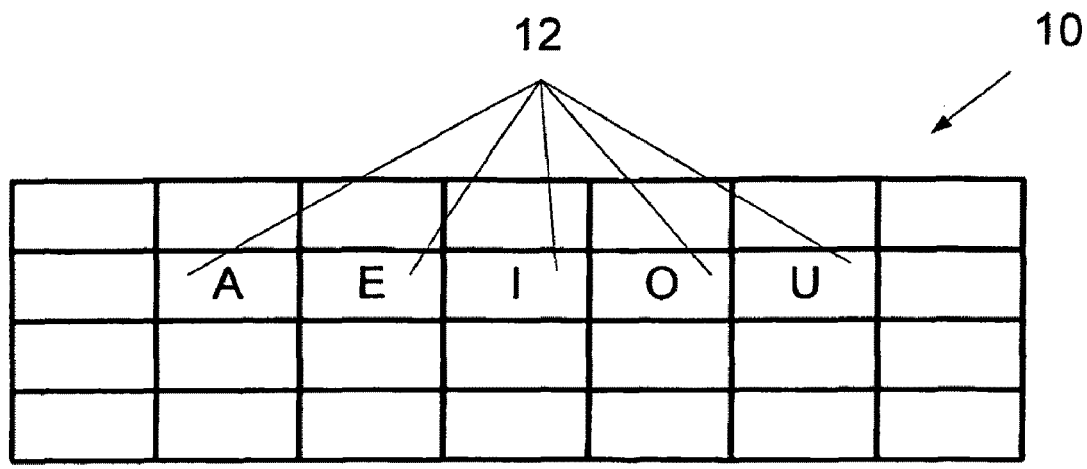
FIGS. 2 to 8 are schematic diagrams illustrating placement of the keys of the keyboard according to a preferred layout process.

(iii) Identify the vowels in the target language in general usage and arrange them in alphabetical order on a selected generally central row of the array of keys 10 in the manner shown in FIG. 2. For English, all vowels are generally or commonly used, but other languages have accented vowels that are rarely used and should not be placed in the generally central location. Table 1 shows the vowels in the alphabet of the target language being English.

TABLE 1

| Letter |
| --- |
| A |
| E |
| I |
| O |
| U |

(iv) Rank consonants of the target language in descending order of frequency of occurrence. Table 2 shows the relative frequency of use of consonants in the alphabet of the target language.

TABLE 2

| Letter | Frequency | Category |
| --- | --- | --- |
| t | 1 | High frequency consonants up to 2 times Number of vowels |
| n | 2 | |
| r | 3 | |
| s | 4 | |
| h | 5 | |
| d | 6 | |
| l | 7 | |
| f | 8 | |
| c | 9 | |
| m | 10 | |
| g | 11 | First 3 potential start/end members |
| y | 12 | |
| p | 13 | |
| w | 14 | Next 3 potential start/end members |
| b | 15 | |
| v | 16 | |
| k | 17 | Lower frequency consonants |
| x | 18 | |
| j | 19 | |
| q | 20 | |
| z | 21 | |

(v) Select twice the number of vowels in the target language of the most frequent consonants, ie 10 consonants for 5 vowels, and sort them alphabetically. Table 3 shows the high frequency consonants of the target language in alphabetical order. For the English language, 72% of words begin with a consonant and there is a 75% probability that the second letter will be a vowel. Thus, the most common consonants that start words must be easy to find and should ideally be adjacent to a vowel that is most likely to be the second letter of the word. The five vowels start 28% of words (A 12%, E 2%, I 7%, O 7%, U 1%) and there is a 96% probability that the second letter is a consonant so the vowels must also be easy to find and adjacent to common consonants.

TABLE 3

| Letter | Frequency | Position |
| --- | --- | --- |
| c | 9 | =Row above vowels |
| d | 6 | |
| f | 8 | |
| h | 5 | |
| l | 7 | |
| m | 10 | =Row below of vowels |
| n | 2 | |
| r | 3 | |
| s | 4 | |
| t | 1 | |

Figure 3:
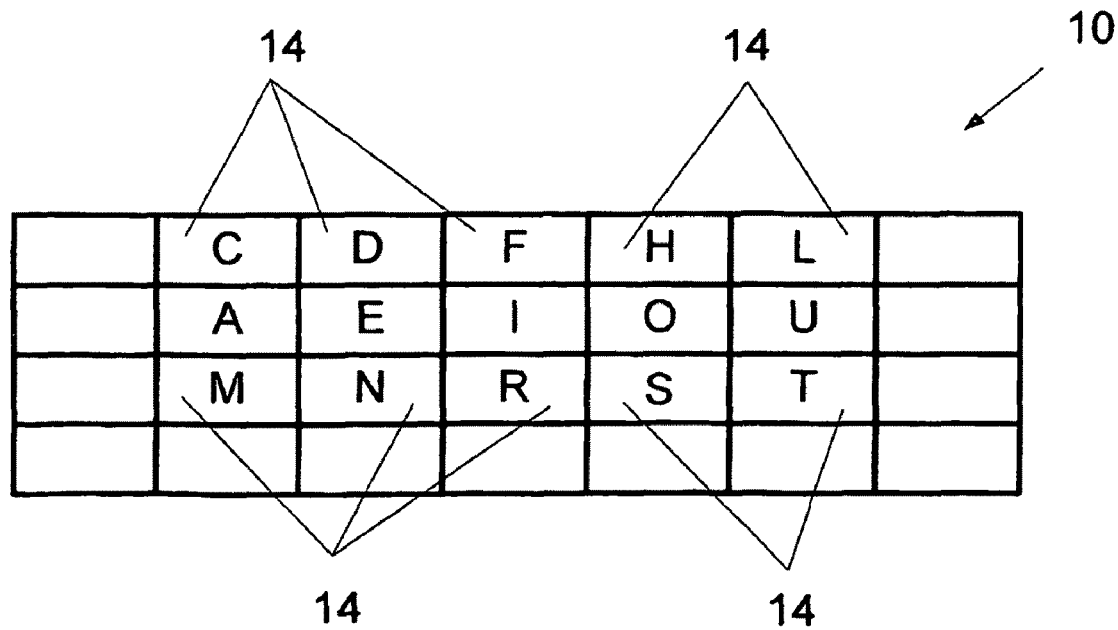

(vi) Arrange the first half of the high frequency consonants in alphabetical order on the top row of the array of keys 10, and the remainder of the high frequency consonants in alphabetical order below the vowels on the third row in the manner shown in FIG. 3.

Figure 4:
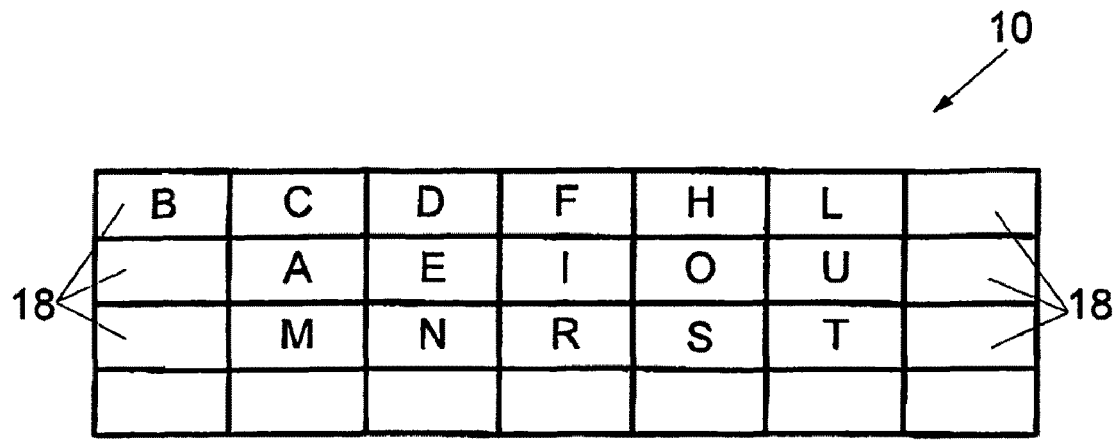
Figure 5:
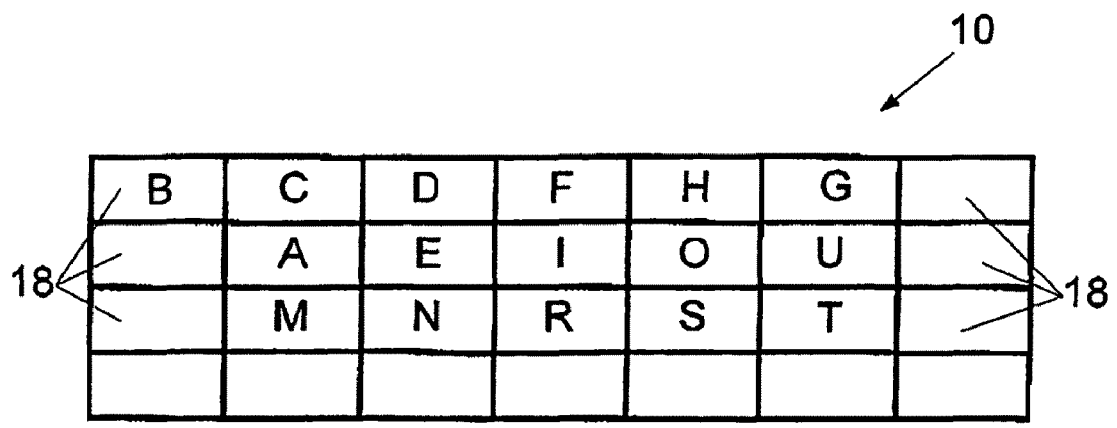

(vii) Consider locations for the next six consonants from Table 2 that will potentially occupy the start/end key positions 18 of the first three rows of the array of keys 10. Determine how closely each of the six consonants corresponds to the characters surrounding each of the start/end positions 18 of the array of keys 10. Arrange a consonant in a start/end position 18 if the degree to which the consonant corresponds to the characters of the keys surrounding the start/end key position 18 is high. For example, the consonant "B" is arranged in the start position 18 of the first row of the array of keys 10 because it closely corresponds to the character "C" that is located adjacent the mentioned start position 18, as shown in FIG. 4. Determine how closely each of the remaining consonants of the six consonants corresponds to the characters in the first three rows. Replace a character in one of the first three rows if it is apparent that the replacement character would more highly correspond to the characters of the keys surrounding that position than the character that is presently in situ. For example, the consonant "G" more closely corresponds to the consonant "H" than the consonant "L". As such, the consonant "G" replaces the consonant "L" in the second end position 18 of the first row of the array of keys 10 in the manner shown in FIG. 5. If any one of the six consonants cannot be logically arranged in the first three rows, then arrange the consonant in the last or fourth row near letters that occur in close alphabetical sequence. Adjust other positions of displaced letters accordingly. Table 4 shows the top 10 consonants and potential start/end members.

TABLE 4

| Row | Letter | Frequency | Position |
| --- | --- | --- | --- |
| Above vowels | b | 15 | =Start member |
| | c | 9 | |
| | d | 6 | |
| | f | 8 | |
| | h | 5 | |
| | g | 11 | =Displace L |
| | l | 7 | =End member of top or start member of next row |
| Vowels | A | | |
| | E | | |
| | I | | |
| | O | | |
| | U | | |
| Below vowels | m | 10 | |
| | n | 2 | |
| | r | 3 | |
| | s | 4 | |
| | t | 1 | |
| | y | 12 | |

TABLE 4-continued

| Row | Letter | Frequency | Position |
|---|---|---|---|
| Last or 4<sup>th</sup> Row | p | 13 | Remaining 3 potential start/end members placed in last row since less frequent |
| | w | 14 | |
| | v | 16 | |

Figure 6:
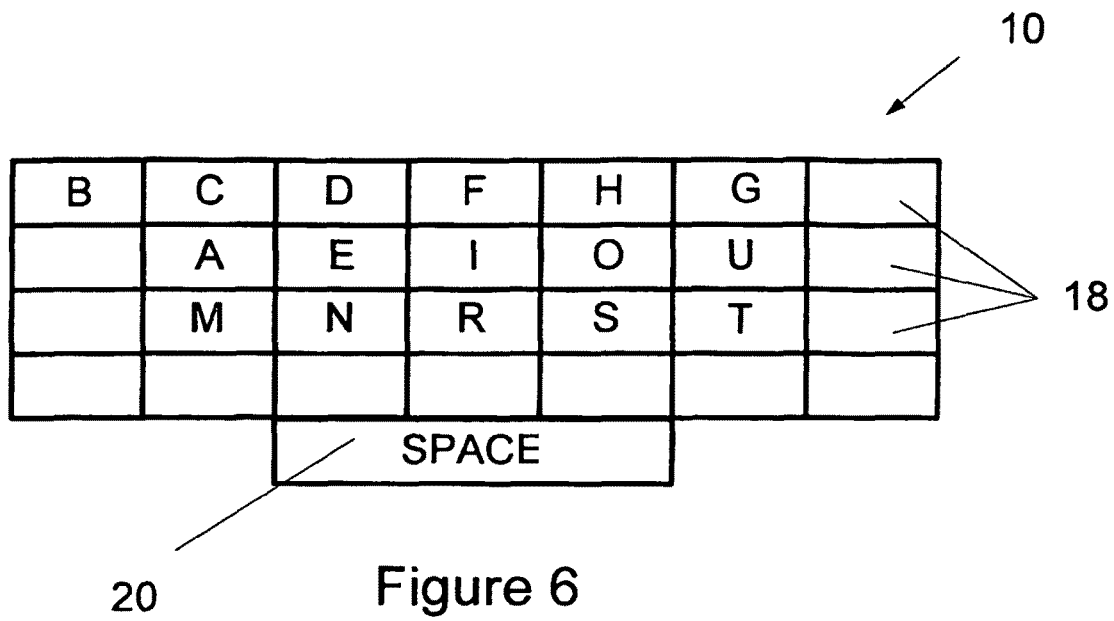

(viii) Select a preliminary position for the "Space" key 20 preferably near the centre of the bottom of the grid, as shown in FIG. 6. This position was found to be preferable in eye-gaze tracking tests of novice users.

Figure 7:
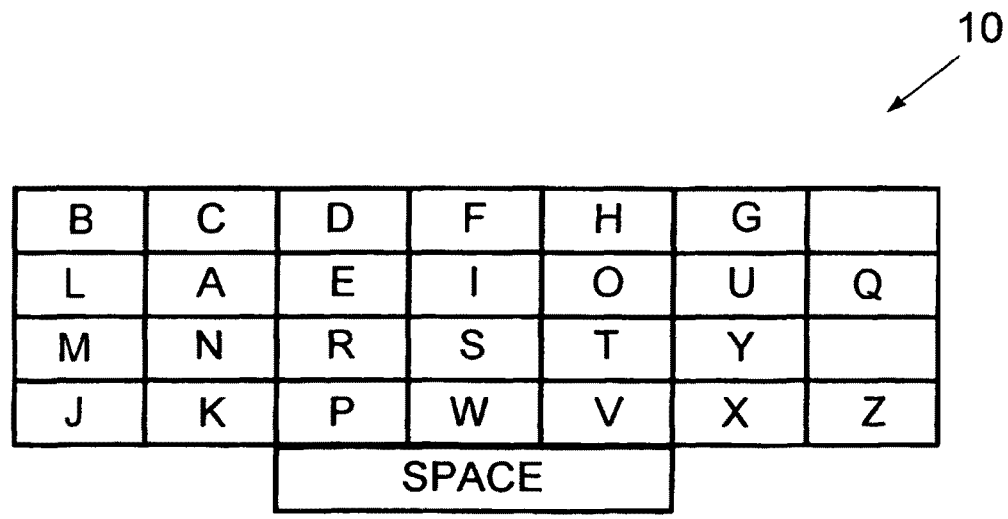

(ix) Arrange the remaining low frequency consonants from Table 2 on the array of keys 10 in alphabetical order, or within proximity to close alphabetical groups, in the manner shown in FIG. 7. Make minor adjustments such as swapping letters into alphabetical sequence. Table 5 shows all letters including low frequency consonants. If fewer keys are desired on the keyboard then the lowest frequency characters can be added to other more frequent keys in conjunction with a suitable disambiguation mechanism such as double-tapping and/or basic word disambiguation software logic.

TABLE 5

| Row | Letter | Frequency | Position |
|---|---|---|---|
| Above vowels | b | 15 | Start member |
| | c | 9 | |
| | d | 6 | |
| | f | 8 | |
| | h | 5 | |
| | g | 11 | |
| | j | 19 | End member |
| Vowels | l | 7 | Set L as start of vowel row |
| | A | | |
| | E | | |
| | I | | |
| | O | | |
| | U | | |
| | q | 20 | Set end member. Occurs often with "U" |
| Below vowels | m | 10 | Set as start member |
| | n | 2 | |
| | r | 3 | |
| | s | 4 | |
| | t | 1 | |
| | y | 12 | |
| Last or 4<sup>th</sup> Row | j | 19 | Low frequency consonant. Grouped below "l", "m" and "n". |
| | k | 17 | |
| | p | 13 | Remaining 3 potential start/end members placed in last row since less frequent |
| | w | 14 | |
| | v | 16 | |
| | x | 18 | Place after "w" and "v". |
| | z | 21 | Place in alphabetical order after "y" |

(x) Validate and test the keyboard 10 with the top 10-100+ words in the target language. Set out below are examples of most common words in English, German, French and Dutch.

| English | German | French | Dutch |
|---|---|---|---|
| the | der | de | de |
| of | die | la | van |
| to | und | le | een |
| and | in | et | het |
| a | den | les | en |
| in | von | des | in |
| for | zu | en | is |
| is | das | un | dat |
| The | mit | du | op |
| that | sich | une | te |
| on | des | que | De |
| said | auf | est | zijn |
| with | für | pour | voor |
| be | ist | qui | met |
| was | im | dans | die |
| by | dem | a | niet |
| as | nicht | par | aan |
| are | ein | plus | er |
| at | Die | pas | om |
| from | eine | au | Het |
| it | als | sur | ook |
| has | auch | ne | als |
| an | es | se | dan |
| have | an | Le | maar |
| will | werden | ce | bij |
| or | aus | il | of |
| its | er | sont | uit |
| he | hat | La | nog |
| not | daB | Les | worden |
| were | sie | ou | door |

In English, the most common words are "the" and "and", while words containing "th" are relatively uncommon in other languages not influenced by ancient Norse.

Figure 8:
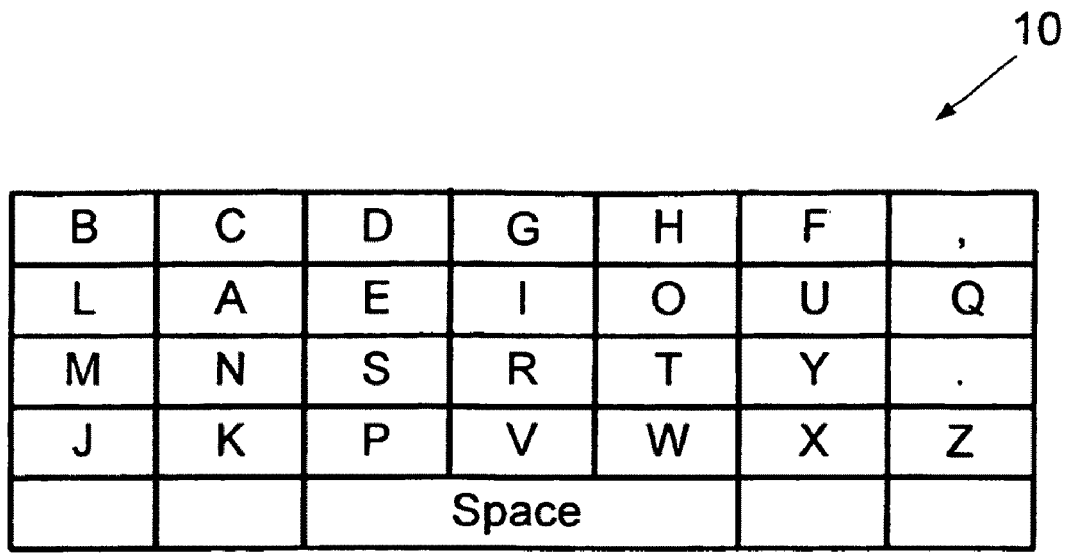
Figure 9:
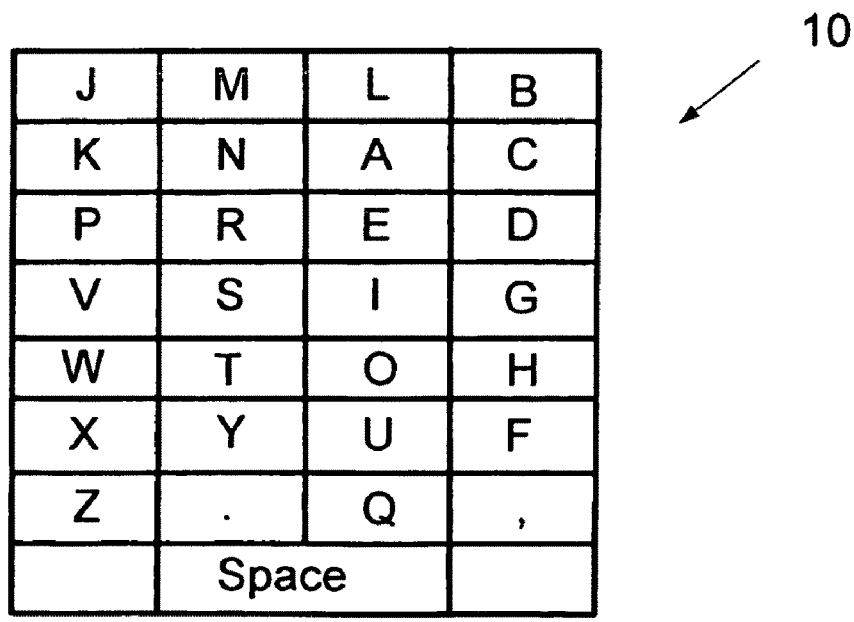
FIGS. 9 to 10 are schematic diagrams of alternative layouts for preferred embodiments of a keyboard having a different orientation.
Figure 10:
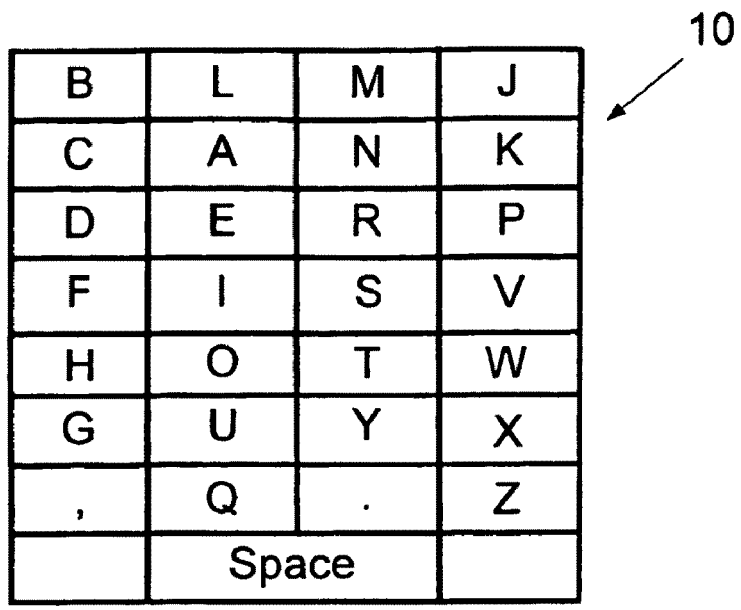

The test is extended so as to be conducted when data input rate enhancement methods are added and used with the keyboard. These methods are normally implemented in software and provide predictive word and phrase completion, using "flexible spelling" which predicts words that are spelt phonetically, word bank lists, grammar, "learning" dictionaries, suggested endings, and abbreviation expansion. The keyboard is fine-tuned for common letter-pair combinations such as prefixes that start words where appropriate, which can give the layout shown in FIG. 8. For example, "AS" is a common combination and the "S" character could be swapped with "R" character so that "S" is closer to "A". In making this change, the third row of the array 10 includes the familiar "RTY" sequence found on QWERTY keyboards. Table 6 shows a refinement of final letter positions. If a different orientation of the array of keys 10 is required, then simple rotations and reversals can be made during the layout process to achieve a suitable result. Examples of such different layouts of the keys 10 derived using the layout process for different orientations are shown in FIGS. 9 and 10.

TABLE 6

| Row | Letter | Frequency | Reasons for change of position. |
|---|---|---|---|
| Above vowels | b | 15 | |
| | c | 9 | |
| | d | 6 | |
| | g | 11 | Swap "g" with "f" to make "ing" easier to type |
| | h | 5 | |
| | f | 8 | |
| | , | | Use last open key for the comma symbol. |

TABLE 6-continued

| Row | Letter | Frequency | Reasons for change of position. |
|---|---|---|---|
| Vowels | l | 7 | |
| | A | | |
| | E | | |
| | I | | |
| | O | | |
| | U | | |
| | q | 20 | |
| Below vowels | m | 10 | |
| | n | 2 | |
| | s | 4 | Swap "s" with "r" since "as" is common & also now forms familiar "rty" sequence found on QWERTY keyboards. |
| | r | 3 | |
| | t | 1 | |
| | y | 12 | |
| | . | | Use last open key for full stop symbol. |
| Last or 4$^{th}$ Row | j | 19 | |
| | k | 17 | |
| | p | 13 | |
| | v | 16 | Swap "v" with "w" to create alphabetical "v, w, x" sequence. |
| | w | 14 | |
| | x | 18 | |
| | z | 21 | |

(xi) Arrange control, number and function buttons on the array of keys 10 to suit the shape of the hand held computer device. Control characters can be placed to suit the purpose and physical construction and ergonomic constraints of a specific handheld computer device. For example, a telephone or calculator device may have numeric indicia placed on dual-purpose keys to enable easy dialing. For some dual thumb or two-handed embodiments described later, splitting the keyboard into a left and right half is also performed here while trying to achieve a balanced workload between left and right hands.

(xii) Test the arranged characters with novice users for "intuitive" ease of learning and speed of typing compared to their past performance or competing designs. Tests are completed with and without the computer device having rate enhancement methods enabled, and the layout can be adjusted based on user feedback.

Figure 11:
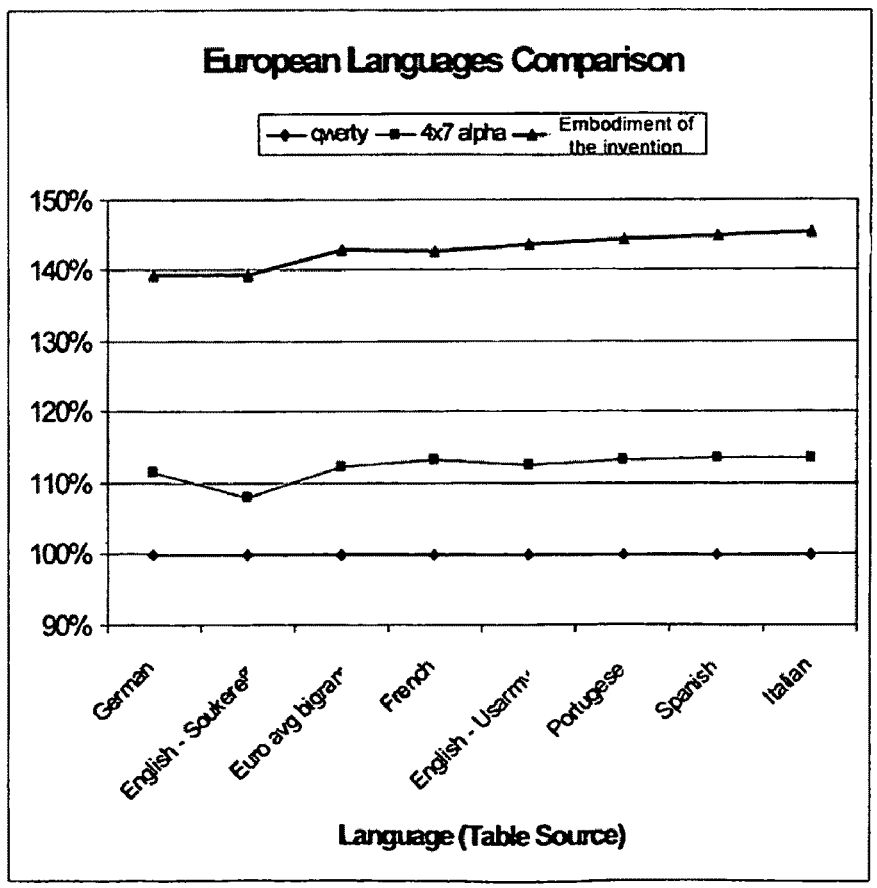
FIG. 11 is a chart showing the relative performance of the keyboard for different European languages.

Using Soukereff and Mackenzie's industry recognised modelling technique, the theoretical performance of the following keyboards for a number of European languages is shown in FIG. 11:

1. The QWERTY keyboard;
2. A 4×7 alphabetical keyboard; and
3. A keyboard having the array of keys 10 shown in FIG. 1.

The keyboard having the array of keys 10 shown in FIG. 1 is consistently 30 to 40% better than the 4×7 and the QWERTY keyboards.

Figure 12:
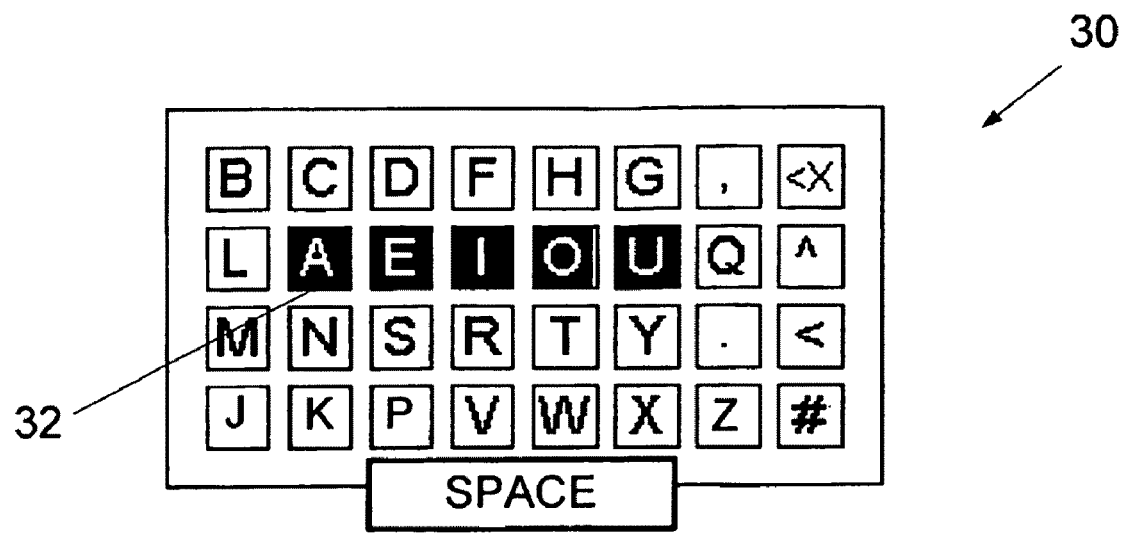
FIG. 12 is a diagram of a preferred horizontal keyboard for the English language.

The array of keys 30 shown in FIG. 12 shows a final exemplary layout for the characters of the English alphabet for a keyboard having a 4×8 array of keys. The 5 vowels 32 of the English language are highlighted.

FIGS. 13 to 19 show exemplary arrangements of characters for the array of keys 30 for different vowel-based target languages, other than English. The arrangement of characters for each target language is effected by following the above described layout process steps. In these examples, the vowels 32 have been highlighted and the use of special accents or superscripts has been left out for clarity. There are a number of known mechanisms that can be used to implement such features in software or hardware embodiments.

Figure 13:
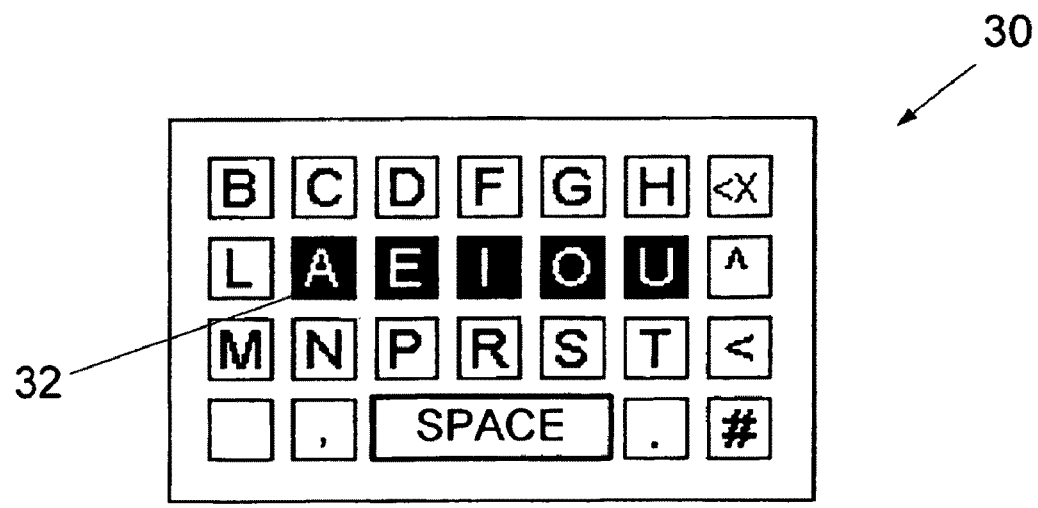
FIG. 13 is a diagram of a preferred horizontal keyboard for Gaelic.

The array of keys 30 shown in FIG. 13 is a layout for the characters of the Gaelic alphabet that has 18 letters. The Gaelic alphabet does not include the following letters: J, K, Q, V, W, X, Y, Z.

Figure 14:
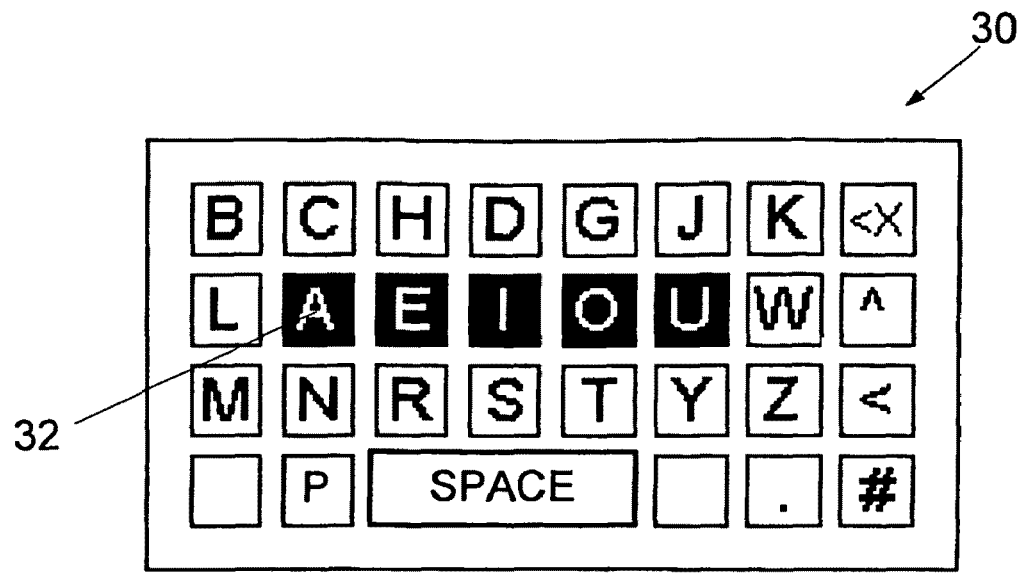
FIG. 14 is a diagram of a preferred horizontal keyboard for South Korean transliteration.

The array of keys 30 shown in FIG. 14 is a layout for the characters of the official South Korean transliteration system, ie Korean in the Latin alphabet having 22 letters. The alphabet does not use the following letters: F, Q, V, X.

Figure 15:
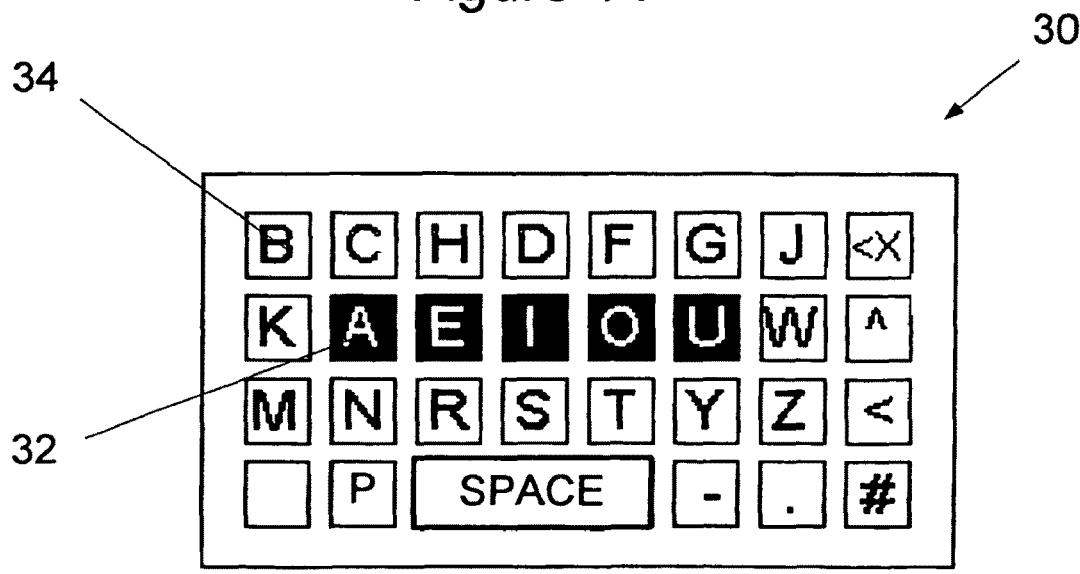
FIG. 15 is a diagram of a preferred horizontal keyboard for Japanese Romaji.

The array of keys 30 shown in FIG. 15 is a layout for the characters of Japanese Romaji with 22 letters in their alphabet. The alphabet does not use the following letters: L, Q, V, X. Nearly all the consonants 34 surround the core vowels 32.

Figure 16:
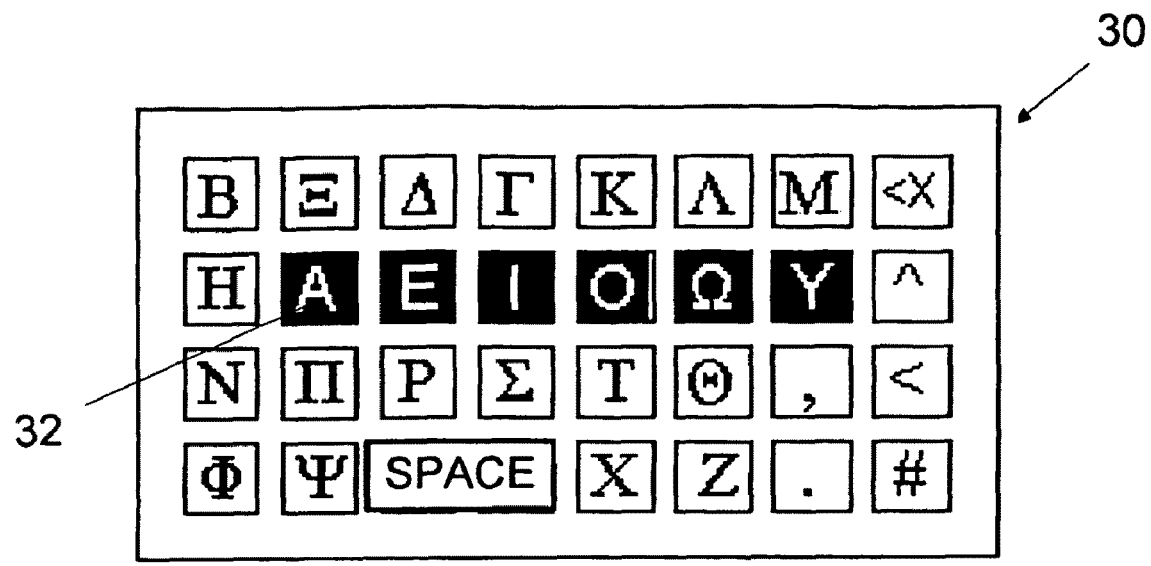
FIG. 16 is a diagram of a preferred horizontal keyboard for the Greek language.

The array of keys 30 shown in FIG. 16 is a layout for the characters of the Greek alphabet that has 24 letters and a special script.

Figure 17:
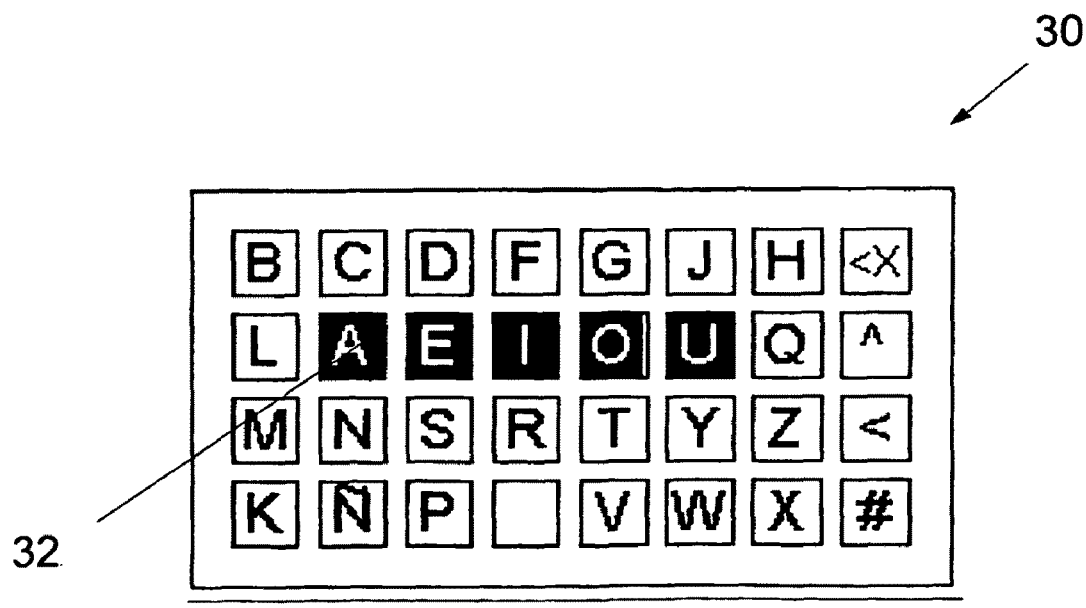
FIG. 17 is a diagram of a preferred horizontal keyboard for the Spanish language.

The array of keys 30 shown in FIG. 17 is a layout for the characters for the Spanish language which has an alphabet that is similar to the English alphabet but has different letter frequencies. For example, the "H" character is much more frequent in English than Spanish, while the "J" character is more common in Spanish than in English. The Spanish character Ñ for the "ni" sound is considered a separate letter rather than merely an accented character. Since it rarely is the first letter of a word, it has been arranged in the bottom row of the keyboard 30, below the more common letter "N" so that it is easy to find visually.

Figure 18:
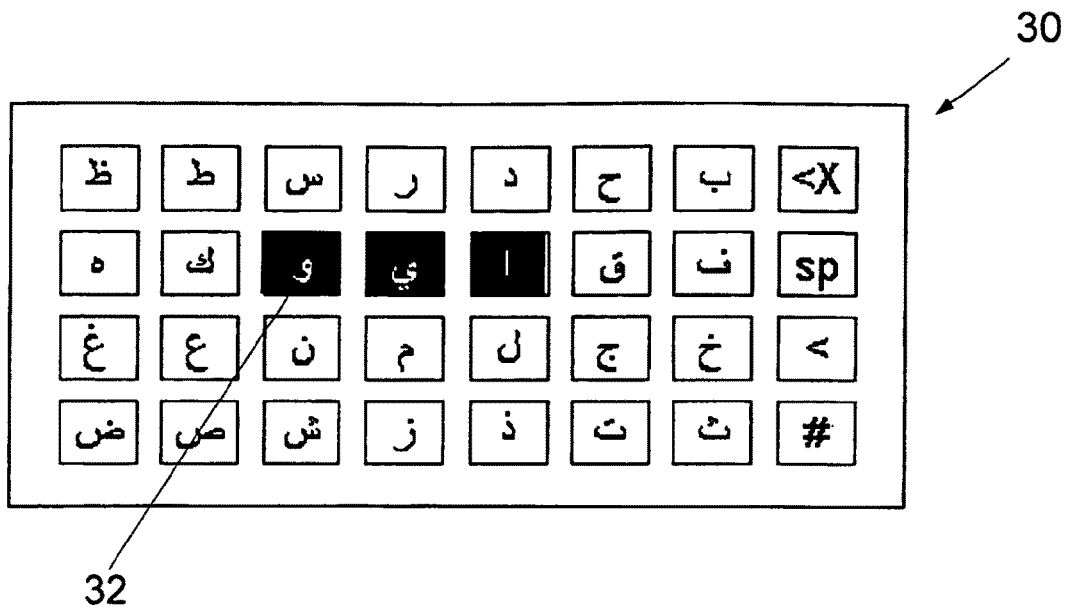
FIG. 18 is a diagram of a preferred horizontal keyboard for Arabic.

The array of keys 30 shown in FIG. 18 is a layout for the characters of the Arabic alphabet that consists of 28 letters. Arabic is read from right to left. The three main and commonly used long vowels letters 'alif, yaa and waaw are included on the control keys 32 from right to left respectively.

Figure 19:
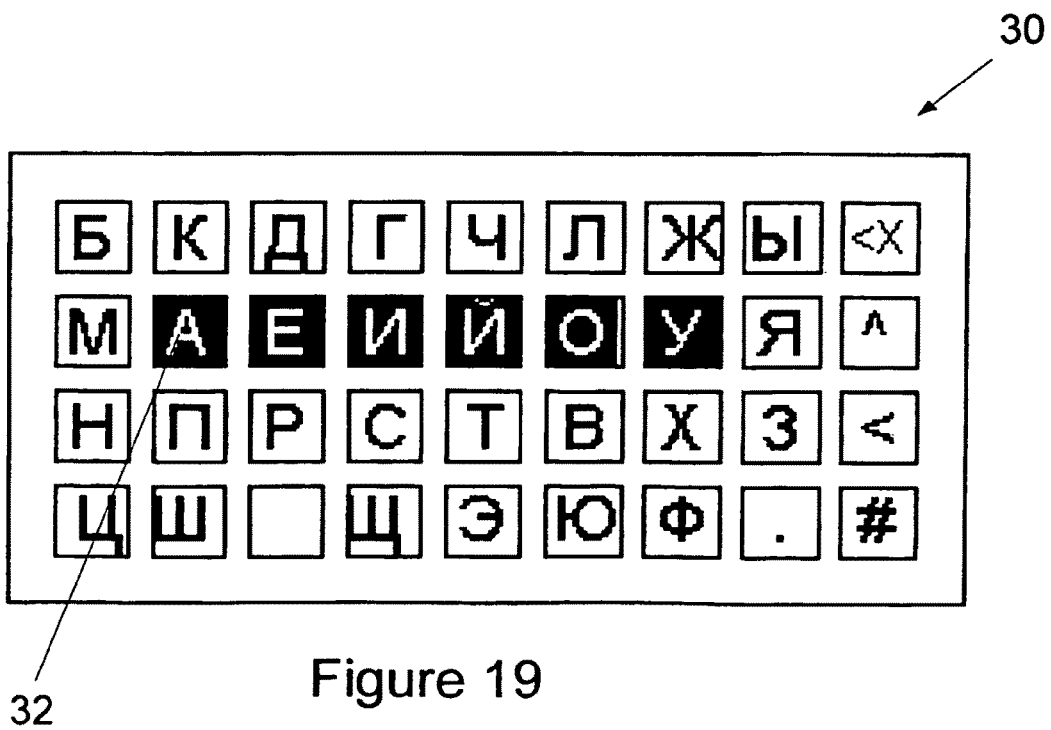
FIG. 19 is a diagram of a preferred horizontal keyboard for Russian Cyrillic.

The array of keys 30 shown in FIG. 19 is a layout for the characters for the Russian Cyrillic alphabet which has 29 letters excluding some special characters. The control keys 32 include the commonly used Russian vowels corresponding to A, E, I, J, O and U. There are a few more vowels but these are characters with accents and are rarely used.

The keyboards described previously can be implemented in a hardware form, by making the keys as fixed input buttons of a device. The keyboard may be incorporated as part of the handheld computer device or built as a separate hardware peripheral.

Figure 20:
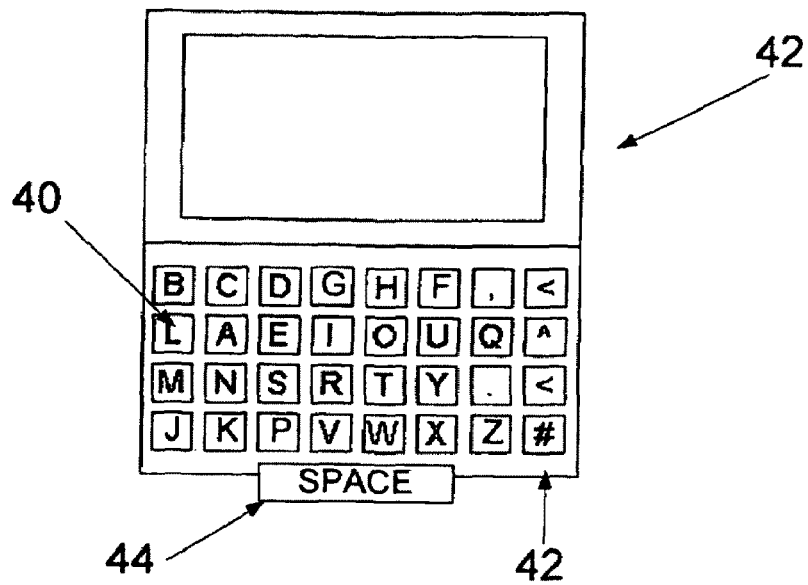

For example, the keyboard 40 of the handheld messaging device 42 shown in FIG. 20 includes character keys arranged for the target language of English. The keyboard 40 has a generally rectangular shape and the travel time to the characters of the keyboard 40 from the centre of the keyboard is minimised. The handheld messaging device 42 includes a horizontal 4 by 7 keyboard 40 with a central "Space" Button 44 on the bottom row and an extra column 46 with ancillary control characters. The keyboard 50 allows the use of buttons that are almost 40% larger than the buttons that would be used on a QWERTY keyboard in the same space on the device 42.

Figures 21, 22:
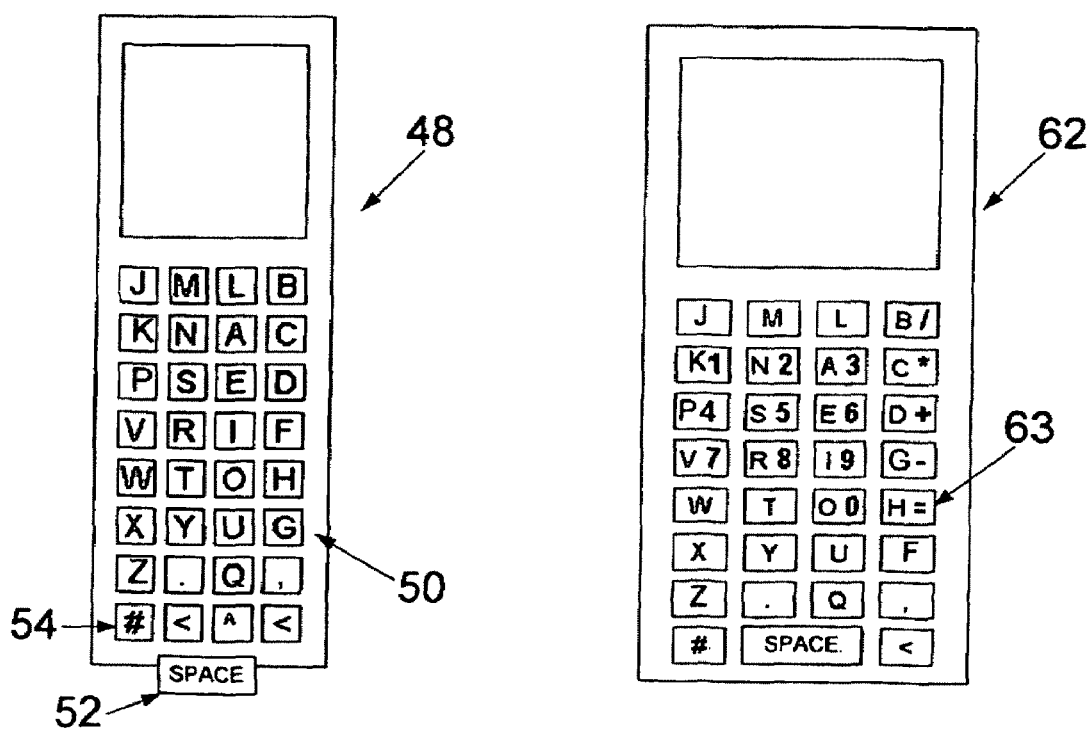

The mobile telephone handset 48 shown in FIG. 21 includes a vertical keyboard 50 having character keys arranged for the target language of English. The keyboard includes a vertical 7 by 4 layout of the characters. The "Space" Button 52 is arranged centrally on the keyboard 50. An extra row 54 with ancillary control characters is placed at the bottom of the keyboard 50.

The device 62 shown in FIG. 22 is similar to the handset 48 shown in FIG. 21, with additional numeric and arithmetical functional keys arranged in a multi-tap configuration with the existing keys. The device 62 is arranged as a vertical keyboard 63 that can be configured for three different purposes: alphanumeric text entry, numeric dialling for a telephone call and use of the device as a simple calculator. To reduce user confusion, the letter "O" is placed on the same key as the number zero "0".

The clamshell device 68 shown in FIG. 23 includes a screen 70 that can be folded onto the keyboard 72 for protection. The keyboard 72 includes character keys arranged in accordance for the target language of English.

It would be understood by those skilled in the art that variations of the above-described keyboard arrangements are possible. For example, the keyboard of the mobile telephone handset shown in FIG. 21 can be rotated by 90 degrees to form a horizontal keyboard 74 of the mobile telephone device 76 shown in FIG. 24. The keyboard 74 can alternatively pivot with respect to the device 76 about a central point 77 in the manner shown in FIGS. 25 and 26. The keyboard 74 of the device 76 shown in FIG. 27 includes pivots about a point 77 so that the bottom edge 79 of the keyboard 74 is adjacent the bottom edge 81 of the device 76. A swivel or rotating bearing mechanism with a limited range of movement, similar to that used on most flip or clamshell mobile phones, is provided in the device 76 to allow the keyboards to pivot and reveal the additional numeric keys 75 underneath.

The handheld computer device 83, shown in FIG. 28a, includes a split keyboard 85 orientated horizontally. The keyboard 85 includes character keys arranged for the target language of English. Each section of the split keyboard 85 is able to rotate about a pivotal point 87 with respect to the device 83 using a swivel or bearing mechanism. With the left and right sections of the keyboard 85 closed together, the keyboard 85 can be used for one-handed, one-finger or stylus. Alternatively, the left and right sides of the keyboard 85 can be pivoted into the open position shown in FIG. 28b to enable ergonomically effective two handed operation when the mobile device 83 can be placed on a firm surface for typing. The left and right sides of the keyboard are set at an angle of 30 degrees to one another, for example.

The device 89 shown in FIGS. 28c and 28d is similar to the device 83 shown in FIGS. 28a and 28b. However the device 89 includes a split pivoting keyboard 91 with a 4 by 6 array of character keys. The very low frequency keys are doubled together. This enables much larger buttons to be used and the central split to shift to between the "E" and "I" keys rather than the "I" and "O" keys creating a better balance between left and right band workloads.

The handheld computer device 78 shown in FIG. 29 includes a screen 80 that separates first and second keyboards 82,84. The keyboards 82,84 are arranged horizontally in a split layout for efficient messaging with left and right thumbs in the English Language.

Figure 30:
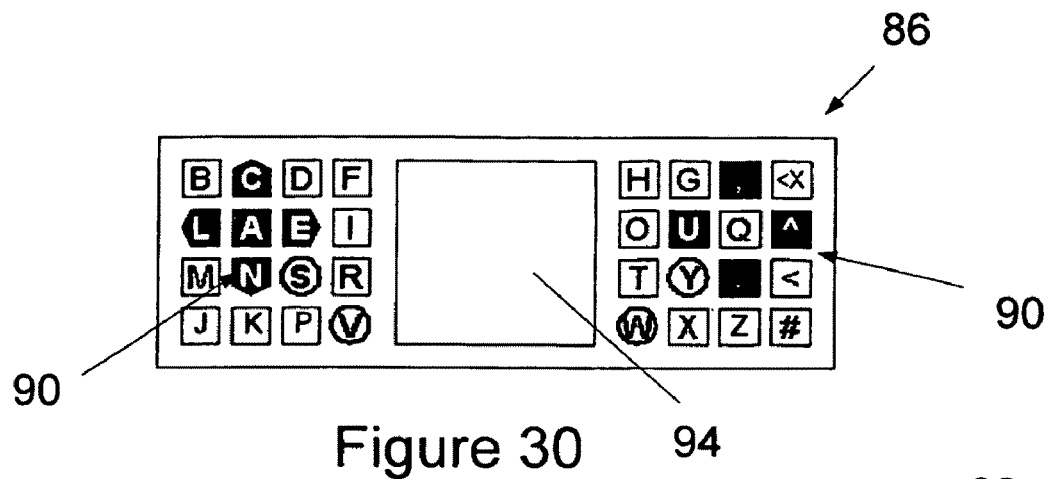
FIGS. 30 to 32 are plan views of handheld game devices having alternative preferred keyboards according to the present invention.
Figure 31:
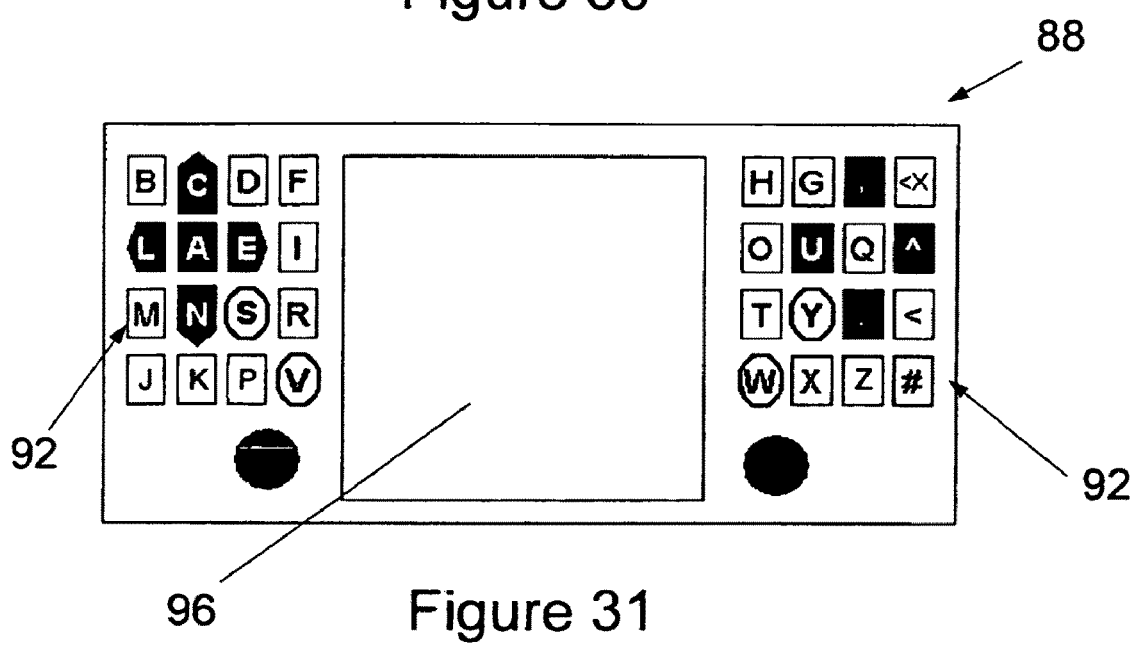

Dual purpose messaging and game devices 86,88 shown in FIGS. 30 and 31 respectively, each include a keyboard 90,92 arranged horizontally that is split with a central screen 94,96. The keyboards 90,92 include character keys arranged in accordance with the above-described method steps for the target language of English. The devices 86,88 are designed for effective gaming and messaging in the English Language. The respective keyboards 90,92 of the devices 86,88 include modified keys that are used for computer games to move an avatar around the screen 90,96 or to initiate specific game actions such as shooting a weapon. The large buttons in FIG. 31 represent joysticks.

Providing easy text entry allows wireless multi-player gamers to "chat" while playing, plot team strategies and tactics or just socialise. While SMS messaging is used with existing 2G mobile phones, the high data rates of 3G phones will allow "instant messaging" dialogues to be cost effective.

Figure 32:
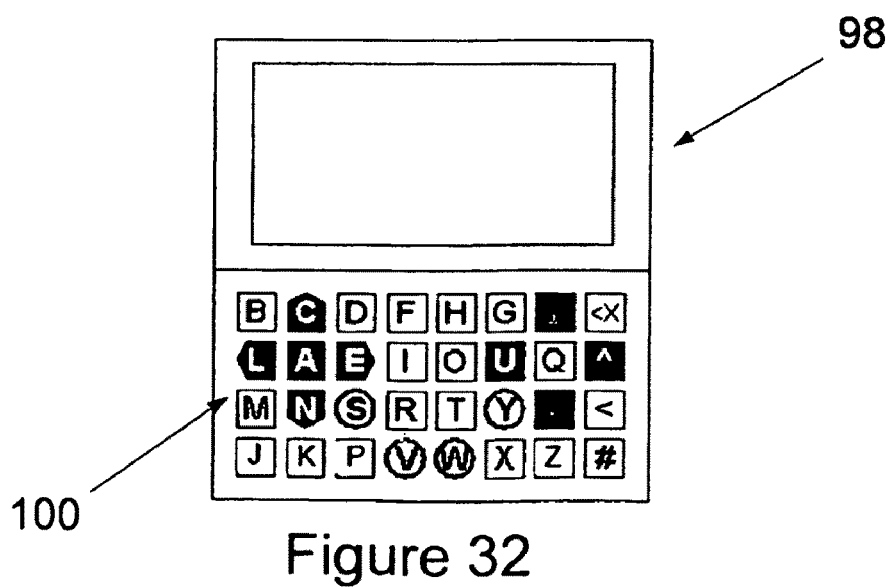

The dual purpose messaging and game device 98 shown in FIG. 32 includes a keyboard 100 arranged horizontally. The keyboard 100 includes character keys arranged for the target language of English.

Figure 33:
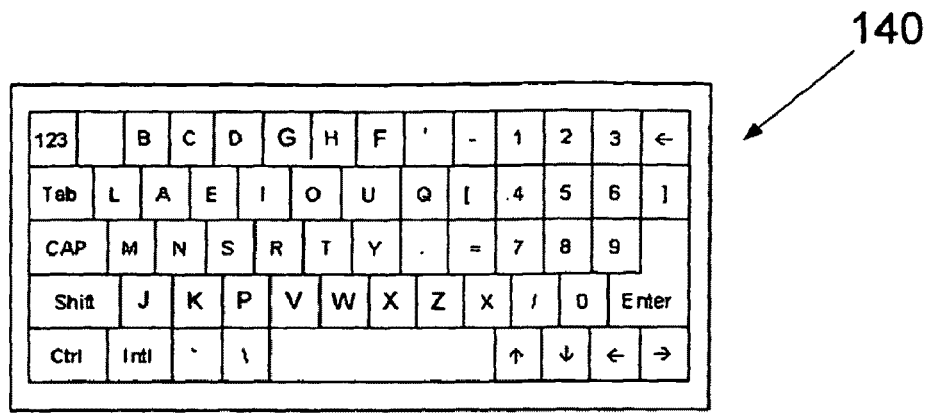
FIGS. 33 to 35 are diagrams providing a plan view of preferred keyboard peripheral devices according to the present invention.
Figure 34:
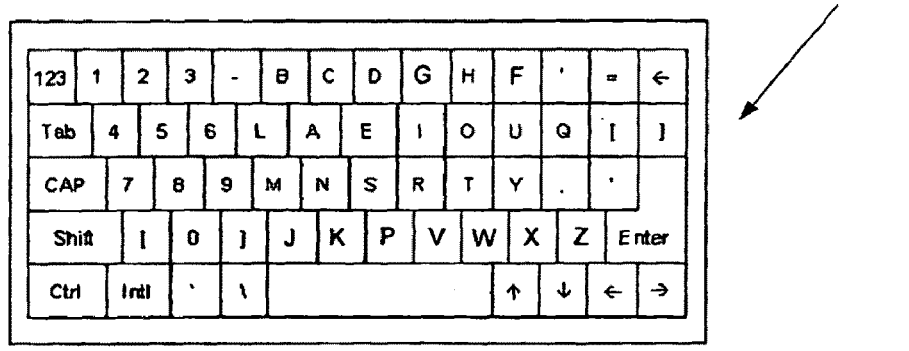

A rectangular keyboard 140, as shown in FIG. 33, is a peripheral hardware device that includes character keys arranged for the target language of English, and is shaped for use with a left hand only. The arrangement of characters can be retrofitted to an existing QWERTY keyboard with suitable driver software. This would be done by rearranging the keycaps of an existing QWERTY keyboard to give the required key layout. The keyboard still sends QWERTY keycodes to the computer, but the driver software translates the keycodes into the desired keyboard output according to the new key layout. A similar keyboard 142 of FIG. 34 is for use with a right hand only.

Figure 35:
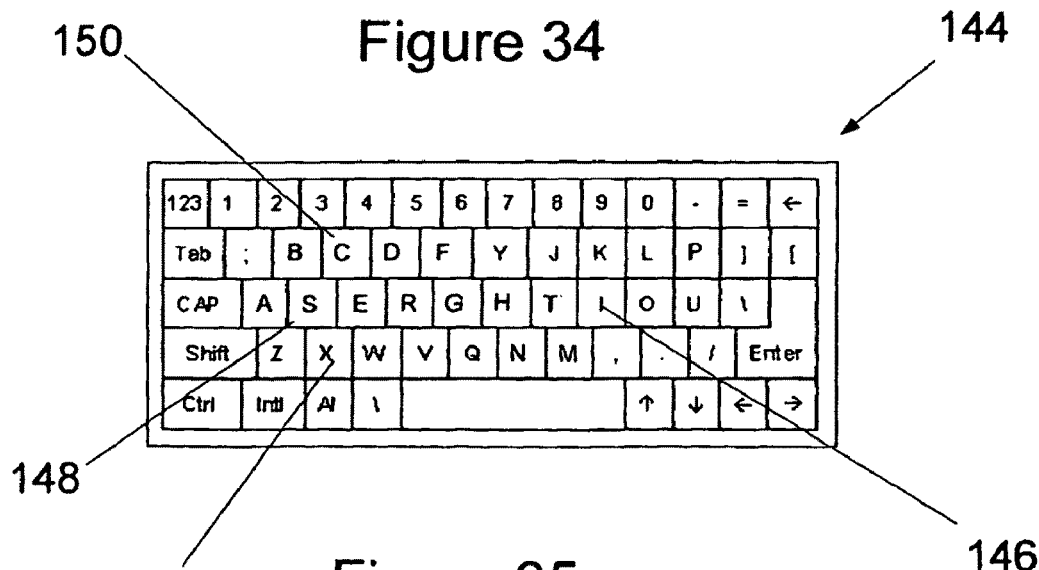

The keyboard 144 of FIG. 35 is a peripheral device configured primarily for two-handed use rather than one-handed use. Recognising that most users will already be familiar with the QWERTY keyboard, the vowels 146 (AEIOU) and commonly used consonants 148 (TSHR) are placed on the middle row as close as possible to the finger that will be used to type the letter on a QWERTY keyboard. Thus, "A" and "E" are placed on the left hand side of the keyboard and "IOU" are placed on the right hand side of the keyboard. The medium frequency consonants 150 are placed in pseudo-alphabetical order in the row above the vowels where they are easier to see and to reach for "hunt and peck" typists. The remaining low frequency consonants 152 from the end of the alphabet are placed on the bottom row using their familiar original positions on the QWERTY keyboard as a guide. This results in the reverse alphabetical sequence for Z, X, W, V. The main exception is the very common letter "T" that is placed under the right index finger in the home position next to the letter "H".

The arrangement of the character keys of a two-handed keyboard 144 is based on splitting the most common links between consonants and vowels so that as the right hand types a vowel the other hand is getting into position to strike the next consonant. That is in a two handed keyboard speed comes from having common letter pairs split between left and right sides while in a mono key board the aim is to get common letter pairs together so that a minimum of time is wasted travelling between keys. The most common letters (top 19%, middle 67%, bottom 14%) will be on the middle row in the home position, while the other less frequent letters should be easy to find or recall because they are logically grouped close together around the keyboard.

Additional hardware embodiments are possible, such as wearable keyboards, datagloves, watches with inbuilt PDA functions, handheld data entry devices for industrial applications such as meter-reading and labelling and special input devices for the disabled.

The keyboard can also be implemented in software so as to be presented as a user interface, for example, on a touch screen of a personal digital assistant (PDA) or a Tablet PC.

Figure 36:
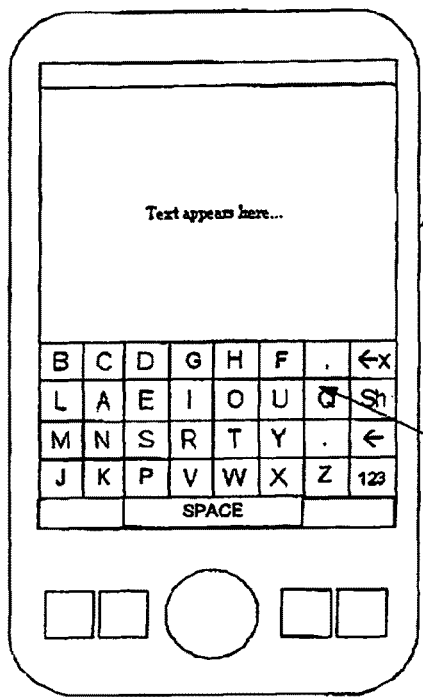
FIGS. 36 to 38 and 40 are diagrams of Personal Digital Assistants (PDA) having alternative screen interface keyboards according to the present invention.
Figure 37:
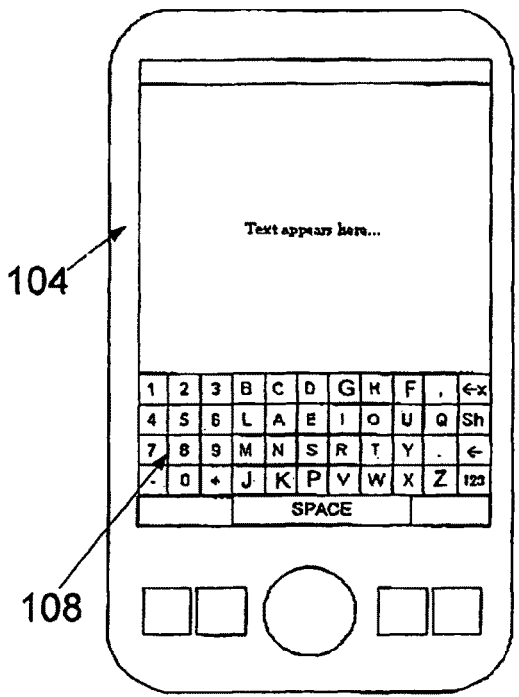

For example, the PDAs 102,104 shown in FIGS. 36 and 37 include interface keyboards 106,108 that include character keys arranged in accordance with the above-described method steps for the target language of English, without and with numeric keyboards.

Figure 38:
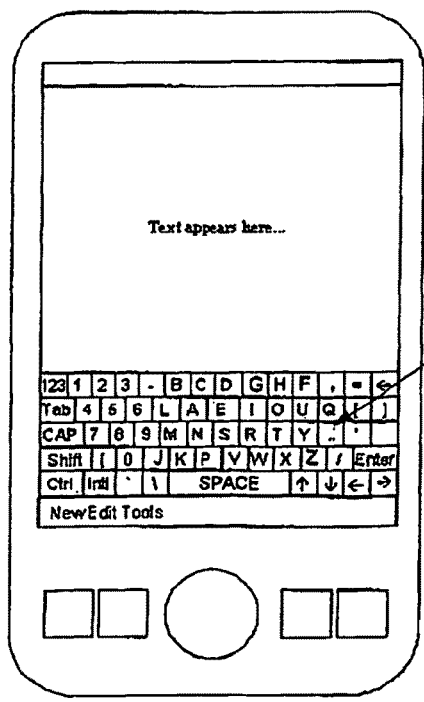
Figure 39:
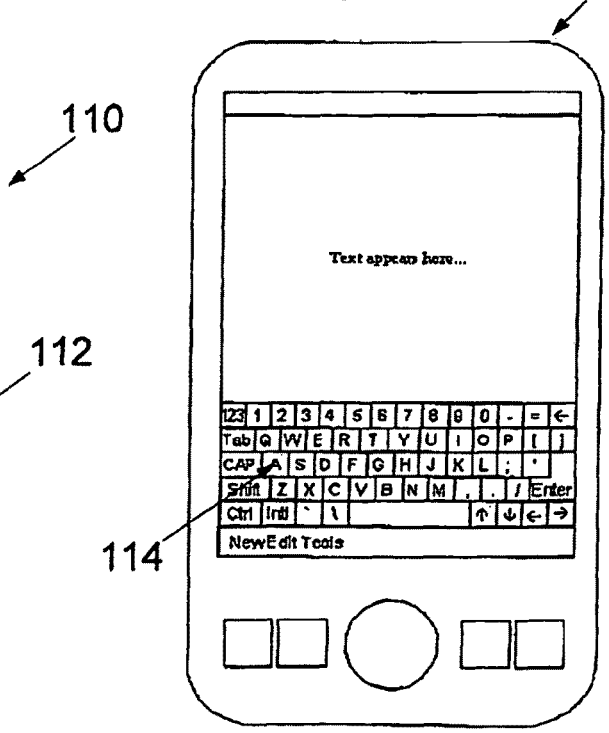
FIG. 39 is a diagram of a PDA having a standard QWERTY keyboard interface.

The PDA 110 shown in FIG. 38 includes a keyboard 112 that has character keys arranged for the target language of English. The characters of the keyboard 112 have been placed into a traditional QWERTY keyboard angled grid with a space bar beneath the grid. The 4 by approximately 7 column wide grouping of the vowels and consonants results in less travel from side to side of the full device screen when compared with the 3 by approximately 10 column wide mix of the vowels and consonants in QWERTY keyboard 114 of the PDA 116 shown in FIG. 39. This comparison shows how the stylus will need to travel much shorter distances to type in text—avoiding the left hand number area and rarely entering the bottom row where the low frequency occurrence letters are. Additional benefits also come from not having to move the whole hand from side to side since just moving the fingers provides sufficient range of movement.

Figure 40:
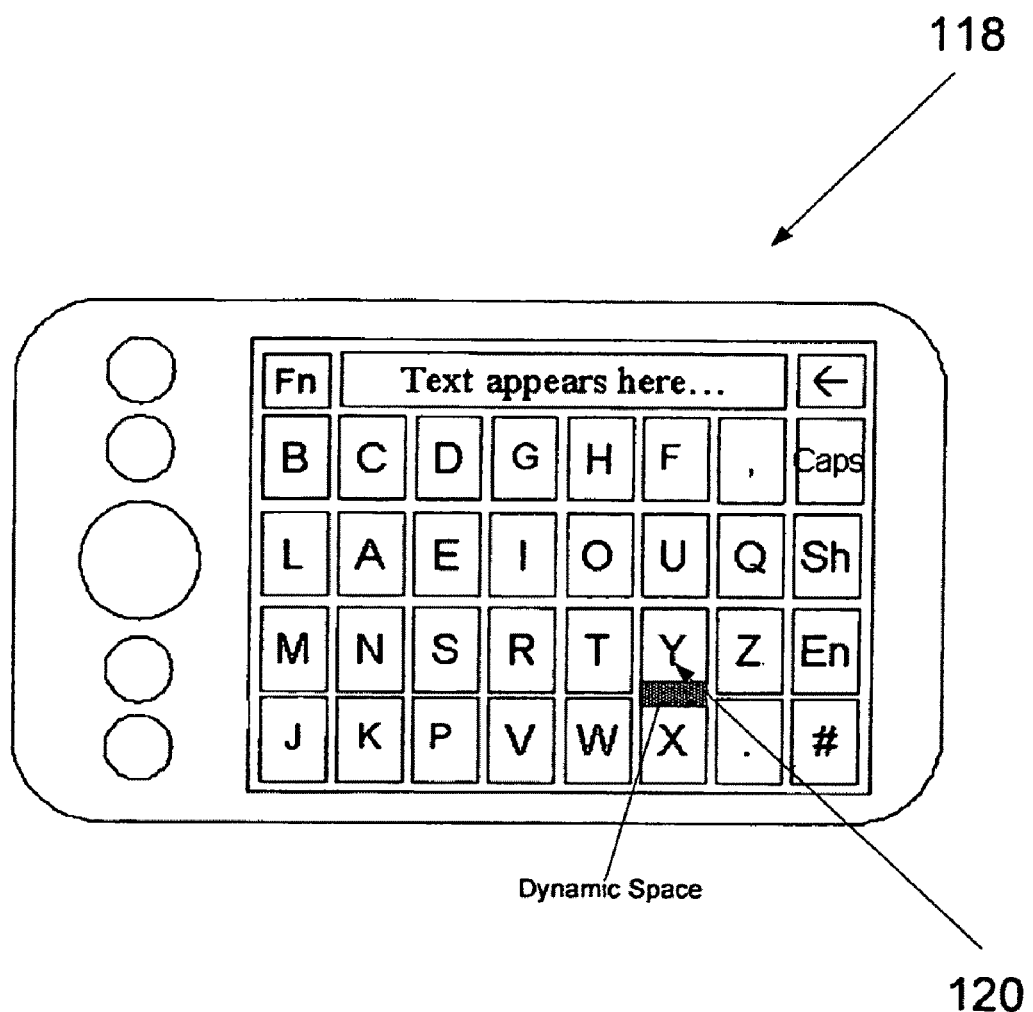

The PDA 118 shown in FIG. 40 includes a keyboard 120 that has character keys arranged on a square grid for the target language of English, and has a screen 122 that displays the keyboard in a horizontal landscape orientation. The keys of the keyboard 120 are large enough to be struck directly by a finger or a thumb on the touch screen 122 rather than a stylus. Further speed can be gained by having a dynamic space button that appears adjacent to the last key tapped by the stylus. Thus rather than travelling a relatively long distance to the space bar at the bottom of the keyboard, only a slight movement of the stylus is required, as shown in FIG. 40.

Figure 41:
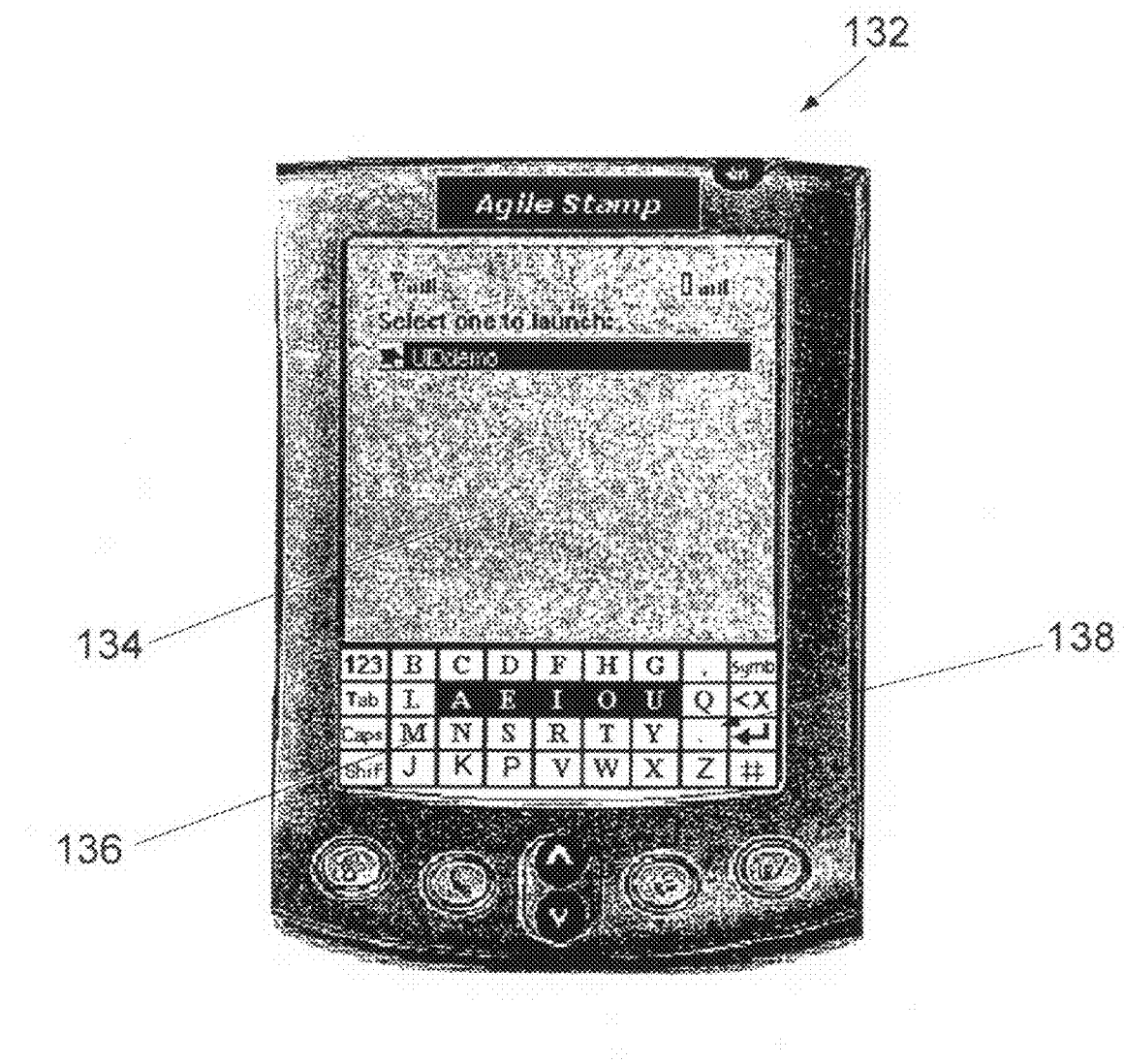
FIG. 41 is a diagram of a PDA having a preferred touch pad keyboard according to the present invention.

The PDA 132 shown in FIG. 41 has a hybrid hardware/software keyboard implementation and uses a touchpad 134 (rather than touch screen) that is overlaid with a paper, or plastic, image 136 of the keyboard layout to enable data entry.

Joysticks can also be used to navigate a cursor left and right, and up and down for character selection by pressing the associated joystick button. In conjunction with the above-described dynamic space button faster text entry speeds of text entry are possible when compared to multi tap methods.

Additional software embodiments are possible, such as on Tablet PCs where both small keyboards for stylus use as well as large keyboards for two-handed use may be appropriate in different applications. Also virtual keyboard visualisation and eye-tracking technologies such as laser projection onto flat surfaces or even brain-wave driven cursor could use a keyboard according to the present invention.

Claims defining the invention are as follows:

1. A compact one-handed keyboard for a hand held computer device including an array of keys comprising characters of an alphabet of a language, wherein the array includes:
   (a) first keys arranged together in a contiguous alphabetical sequence of at least five characters, said first keys, when pressed, providing computer input sending signals corresponding to respective frequently used vowel characters;
   (b) second keys arranged adjacent to the first keys, said keys, when pressed, providing computer input sending signals corresponding to respective frequently used consonant characters; and
   (c) third keys arranged in positions remote from the first keys, said third keys, when pressed, providing computer input sending signals corresponding to respective infrequently used consonant characters,
   wherein the second keys are arranged in alphabetical order adjacent to the first keys,
   wherein a first set of the second keys substantially forming the first third of the letters of the alphabet are arranged in a first row; a second set of the second keys substantially forming the middle third of the letters of the alphabet are arranged in a left corner; and a third set of the second keys substantially forming the last third of the letters of the alphabet are arranged in a right corner; and the first keys are arranged in a another row located between left and right corners,
   wherein one or more of the second keys are arranged adjacent to the first keys that they are frequently paired together with in words of the language, and
   wherein the array of keys includes seven or less columns and four or more rows.

2. The one-handed keyboard claimed in claim 1, wherein one or more of the second keys are arranged adjacent to the first keys that they are frequently paired together with in initial parts of words of the language.

3. The one-handed keyboard claimed in claim 1, wherein one or more of the second keys are arranged adjacent to other second keys that they are frequently paired together with in words of the language.

4. The one-handed keyboard claimed in claim 1, wherein one or more of the second keys are arranged adjacent to other second keys that they are frequently paired together with in initial parts of words of the language.

5. The one-handed keyboard claimed in claim 1, wherein one or more of the third keys are arranged adjacent to the second keys that they are frequently paired together with in words of the language.

6. The one-handed keyboard claimed in claim 1, wherein one or more of the third keys are arranged adjacent to the second keys that they are frequently paired together with in initial parts of words of the language.

7. The one-handed keyboard claimed in claim 1, wherein the second keys are located on opposite sides of the first keys.

8. The one-handed keyboard claimed in claim 1, wherein the array of keys includes seven columns and four rows.

9. The one-handed keyboard claimed in claim 1, wherein the array of keys includes four columns and seven rows.

10. The one-handed keyboard claimed in claim 1, wherein a first set of the second keys for early alphabetical order consonants are located on one side above the first keys, and wherein a second set of the second keys for later alphabetical order consonants are located on another side of the first keys.

11. The one-handed keyboard claimed in claim 1, wherein the keyboard is adapted to separate into left and right halves for respective use by left and right hands of an operator of the keyboard.

* * * * *